(12) United States Patent
Huat

(10) Patent No.: US 8,959,036 B2
(45) Date of Patent: Feb. 17, 2015

(54) REAL TIME MONITORING OF SHIP CARGO

(75) Inventor: Ah Huat, Singapore (SG)

(73) Assignee: APL Limited, Scottsdale, AZ (US)

( * ) Notice: Subject to any disclaimer, the term of this patent is extended or adjusted under 35 U.S.C. 154(b) by 0 days.

(21) Appl. No.: 13/044,398

(22) Filed: Mar. 9, 2011

(65) Prior Publication Data
US 2011/0221573 A1 Sep. 15, 2011

Related U.S. Application Data

(60) Provisional application No. 61/312,632, filed on Mar. 10, 2010.

(51) Int. Cl.
G06F 11/00 (2006.01)
G06Q 30/00 (2012.01)
G06Q 10/00 (2012.01)

(52) U.S. Cl.
CPC .................................... G06Q 10/00 (2013.01)
USPC ........................... 705/333; 702/185; 702/188

(58) Field of Classification Search
CPC ..... G07C 5/008; G08B 13/2462; G06Q 10/08
USPC ...................... 705/8, 330; 340/989, 10.1, 3.1
See application file for complete search history.

(56) References Cited

U.S. PATENT DOCUMENTS

| 4,482,785 | A |  | 11/1984 | Finnegan et al. |
| 4,882,564 | A |  | 11/1989 | Monroe et al. |
| 4,885,564 | A |  | 12/1989 | Vercellotti et al. |
| 4,970,496 | A |  | 11/1990 | Kirkpatrick |
| 5,181,389 | A |  | 1/1993 | Hanson et al. |
| 5,424,720 | A |  | 6/1995 | Kirkpatrick |
| 5,437,163 | A |  | 8/1995 | Jurewicz et al. |
| 5,894,266 | A |  | 4/1999 | Wood, Jr. et al. |
| 5,917,433 | A | * | 6/1999 | Keillor et al. .................. 340/989 |
| 5,973,610 | A |  | 10/1999 | Jensen et al. |
| 6,522,638 | B1 |  | 2/2003 | Haugli et al. |

(Continued)

FOREIGN PATENT DOCUMENTS

EP 12 46 094 A1 2/2002
JP 2003-076751 A 3/2003

(Continued)

OTHER PUBLICATIONS

"User Manual, SMS Bridge Global Monitoring System," published by York Marine, Controls on Jul. 5, 2007, pp. 1-15.*

(Continued)

Primary Examiner — Brian Epstein
(74) Attorney, Agent, or Firm — Kilpatrick Townsend & Stockton LLP

(57) ABSTRACT

Remote monitoring and control of the interior environment of a refrigerated shipping container is described. A communications and monitoring device is coupled to a data communications port of a controller of a shipping container. The device is able to receive an operational parameter directly from the controller, without having to install additional instrumentation within the interior of the refrigerated shipping container, and send the operational parameter to a remote station. The device is also able to receive data to control the operation of the refrigerated shipping container from a remote station and send this control data to the controller of the refrigerated shipping container through the data communications port.

36 Claims, 14 Drawing Sheets

(56) References Cited

U.S. PATENT DOCUMENTS

| | | | |
|---|---|---|---|
| 6,679,071 | B1 | 1/2004 | Storey et al. |
| 6,745,027 | B2 | 6/2004 | Twitchell, Jr. |
| 6,826,514 | B1 | 11/2004 | Antico et al. |
| 6,863,222 | B2 | 3/2005 | Slifkin et al. |
| 6,919,803 | B2 | 7/2005 | Breed |
| 6,955,302 | B2 | 10/2005 | Erdman, Jr. |
| 7,098,784 | B2 | 8/2006 | Easley et al. |
| 7,116,223 | B2 | 10/2006 | Stern et al. |
| 7,126,469 | B2 | 10/2006 | Fish |
| 7,283,052 | B2 | 10/2007 | Bohman et al. |
| 7,339,469 | B2 | 3/2008 | Braun |
| 7,394,361 | B1 | 7/2008 | Twitchell, Jr. |
| 7,394,363 | B1 | 7/2008 | Ghahramani |
| 7,455,225 | B1* | 11/2008 | Hadfield et al. ............. 235/384 |
| 7,545,266 | B2 | 6/2009 | Brosius |
| 7,564,350 | B2 | 7/2009 | Boman et al. |
| 7,586,409 | B2 | 9/2009 | Armstrong et al. |
| 7,592,916 | B2 | 9/2009 | Staples |
| 7,612,664 | B2 | 11/2009 | Huang et al. |
| 7,644,017 | B2 | 1/2010 | Pippia et al. |
| 7,658,334 | B2 | 2/2010 | Glielmo et al. |
| 7,702,327 | B2 | 4/2010 | O'Toole et al. |
| 2003/0069648 | A1* | 4/2003 | Douglas et al. ................... 700/2 |
| 2003/0146834 | A1 | 8/2003 | Stevens et al. |
| 2004/0233041 | A1* | 11/2004 | Bohman et al. ............. 340/10.1 |
| 2005/0248463 | A1 | 11/2005 | Williams et al. |
| 2006/0164231 | A1* | 7/2006 | Salisbury et al. ............. 340/505 |
| 2006/0164239 | A1 | 7/2006 | Loda |
| 2007/0040647 | A1* | 2/2007 | Saenz et al. ..................... 340/3.1 |
| 2008/0061959 | A1 | 3/2008 | Breed |
| 2008/0064413 | A1 | 3/2008 | Breed |
| 2008/0088441 | A1 | 4/2008 | Breed |
| 2008/0100706 | A1 | 5/2008 | Breed |
| 2008/0104976 | A1 | 5/2008 | Guglielmetti et al. |
| 2008/0108372 | A1 | 5/2008 | Breed |
| 2008/0129490 | A1 | 6/2008 | Linville et al. |
| 2008/0231453 | A1 | 9/2008 | Corder |
| 2008/0231454 | A1* | 9/2008 | Curcio ........................ 340/572.2 |
| 2008/0246604 | A1 | 10/2008 | McPherson et al. |
| 2008/0252428 | A1 | 10/2008 | Robinson et al. |
| 2008/0270076 | A1 | 10/2008 | Breed |
| 2008/0282817 | A1 | 11/2008 | Breed |
| 2008/0291850 | A1 | 11/2008 | Jensen |
| 2009/0015400 | A1 | 1/2009 | Breed |
| 2009/0134999 | A1 | 5/2009 | Dobson et al. |
| 2009/0198388 | A1 | 8/2009 | Hillis |
| 2009/0216497 | A1* | 8/2009 | Schwiers et al. .............. 702/188 |
| 2009/0237258 | A1* | 9/2009 | Heck et al. .................... 340/585 |
| 2009/0282859 | A1 | 11/2009 | Glielmo et al. |
| 2010/0274604 | A1* | 10/2010 | Crilly ................................. 705/7 |
| 2012/0252488 | A1* | 10/2012 | Hartmann et al. ......... 455/456.1 |

FOREIGN PATENT DOCUMENTS

| | | | | |
|---|---|---|---|---|
| JP | 2003130520 | * | 5/2003 | ............. F25D 23/00 |
| KR | 10-2009-0045596 A | | 5/2009 | |
| TW | 200535591 A | | 8/2005 | |
| WO | 2006/053566 A1 | | 5/2006 | |

OTHER PUBLICATIONS

"User Manual, RefBox," published by York Marine, Controls on Mar. 30, 2005, pp. 1-52.*

Search/Examination Report dated Mar. 9, 2011 from International Patent Application No. PCT/US2011/027680, 14 pages.

Written Opinion issued on Oct. 14, 2013 in Singapore Patent Application No. 201206577-7, filed Mar. 9, 2011, 4 pages.

Office Action from the Intellectual Property Office (IPO), dated Oct. 28, 2014, for ROC (Taiwan) Pat. Appln. No. 100108001, 9 pages.

Supplemental European Search Report from European Patent Office dated Dec. 12, 2014, for EP. Appln. No. 11 75 3984, 8 pages.

* cited by examiner

| | | | Master View | | | |
|---|---|---|---|---|---|---|
| Shipper ID | Container ID | Time | Temp. (F) | Set (F) | Humidity(%) | Set (%) |
| 415 | 888888 | 23:00:00 | 32.0 | 32.0 | 45.4 | 45.0 |
| 007 | 1111111 | 23:00:00 | 45.0 | 45.0 | 30.0 | 30.0 |
| 007 | 222222 | 23:00:00 | 0.0 | 0.0 | 30.5 | 30.0 |
| 630 | 999999 | 23:30:00 | 50.3 | 50.0 | 25.4 | 25.0 |
| 415 | 888888 | 23:30:00 | 32.4 | 32.0 | 44.0 | 45.0 |
| 415 | 888888 | 00:00:00 | 31.8 | 32.0 | 46.0 | 45.0 |
| 415 | 888888 | 00:30:00 | 31.4 | 32.0 | 49.0 | 45.0 |
| 007 | 111111 | 01:00:00 | 45.3 | 45.0 | 30.2 | 30.0 |
| 007 | 222222 | 01:00:00 | -0.3 | 0.0 | 30.6 | 30.0 |
| 415 | 888888 | 01:00:00 | 32.4 | 32.0 | 45.0 | 45.0 |
| 415 | 888888 | 01:07:00 | 65 | 32.0 | 85.0 | 45.0 |
| ... | ... | ... | ... | | ... | |
| 630 | 999999 | 03:30:00 | 50.0 | 50.0 | 25.2 | 25.0 |

FIG. 4(a)

| | | | Shipper ID | | | |
|---|---|---|---|---|---|---|
| Shipper ID | Container ID | Time | Temp. (F) | Set (F) | Humidity(%) | Set (%) |
| 007 | 111111 | 23:00:00 | 45.0 | 45.0 | 30.0 | 30.0 |
| 007 | 222222 | 23:00:00 | 0.0 | 0.0 | 30.5 | 30.0 |
| 007 | 111111 | 01:00:00 | 45.3 | 45.0 | 30.2 | 30.0 |
| 007 | 222222 | 01:00:00 | -0.3 | 0.0 | 30.6 | 30.0 |

FIG. 4(b)

| | | | Container ID | | | |
|---|---|---|---|---|---|---|
| Shipper ID | Container ID | Time | Temp. (F) | Set (F) | Humidity(%) | Set (%) |
| 007 | 111111 | 23:00:00 | 45.0 | 45.0 | 30.0 | 30.0 |
| 007 | 111111 | 01:00:00 | 45.3 | 45.0 | 30.2 | 30.0 |

FIG. 4(c)

| | | | Shipper ID / Container ID | | | |
|---|---|---|---|---|---|---|
| Shipper ID | Container ID | Time | Temp. (F) | Set (F) | Humidity(%) | Set (%) |
| 415 | 888888 | 23:00:00 | 32.0 | 32.0 | 45.4 | 45.0 |
| 415 | 888888 | 23:30:00 | 32.4 | 32.0 | 44.0 | 45.0 |
| 415 | 888888 | 00:00:00 | 31.8 | 32.0 | 46.0 | 45.0 |
| 415 | 888888 | 00:30:00 | 31.4 | 32.0 | 49.0 | 45.0 |
| 415 | 888888 | 01:00:00 | 32.4 | 32.0 | 45.0 | 45.0 |
| 415 | 888888 | 01:07:00 | 65 | 32.0 | 85.0 | 45.0 |

FIG. 4(d)

APL
*Moving Business Forward*

About APL   News   Contact Us   Help   [Search]

HomePort   Routes   Services   Tracking   Schedules   [Shortcuts ▽]

Tracking
▷ Shipment Tracking
▷ Vessel Tracking
▷ E-mail Tracking

Track Multiple Shipments
Enter BL or Container numbers:

[ ] [ ] [ ] [ ] [ ] [ ] [ ]

[Go] [Clear]

Satellite Monitoring and Remote Tracking   SMARTemp™ — 602

BL Number: 98458437

Summary  Booking Details  Hazmat  Routing/Container Status  BL Details  Clearances

Containers — 608   610   612   614   616

| Number | Last Set Temp(°C) | Last Supply Temp(°C) | Last Return Temp(°C) | Date/Time(GMT) | Details |
|---|---|---|---|---|---|
| APRU583763 | -34.4 | -34.0 | -34.4 | 22 Feb 2011 22:28 | ... |
| APRU583697 | -34.4 | -28.6 | 8.3 | 07 Jul 2010 08:17 | ... |

Container Operational Status

Container ID: APRU583763  Date: March 1, 2010  Time: 13:00:00 GMT
         802

Container Door: Closed

Compressor Status:    Normal
Cooling Fans:         Normal
Coolant Flow:         Normal
Coolant Temp: — 806   ALARM
Supply Voltage: — 804 Normal
     808
 .....
 .....
 .....
Temp. Set Point:      32.0
Humidity Set Point:   25%

FIG. 8

Update Container Operational Status

Container ID: APRU583763　　　Date: March 1, 2010　　　Time: 13:00:00 GMT
1102　　　　　　　　　　　　　1114

Container Door: Closed

|  |  | Reset? |
|---|---|---|
| Compressor Status: | Normal | ○ |
| Cooling Fans: | Normal | ○ |
| Coolant Flow: | Normal | ○ |
| Coolant Temp: 1104 | ALARM —1106 | ● —1108 |
| Supply Voltage: | Normal | ○ |
| ...... |  |  |
| ...... |  |  |

New
Temp. Set Point:　　　32.0　　　[ 25.0 ]—1110

Humidity Set Point:　　25%　　　[ 30% ]—1112

[ UPDATE ]—1116

FIG. 11

REAL TIME MONITORING OF SHIP CARGO

CROSS REFERENCES TO RELATED APPLICATIONS

This application is a non-provisional of and claims the benefit of U.S. patent application Ser. No. 61/312,632, entitled "REAL TIME MONITORING OF SHIP CARGO" filed on Mar. 10, 2010, the contents of which are incorporated herein by reference for all purposes.

BACKGROUND

The use of standardized modular shipping containers has revolutionized the shipping industry. Modular shipping containers, often referred to as intermodal containers, freight containers, or simply containers, are reusable containers that can be used to ship products or raw materials from one location to another. Containers may be referred to as intermodal because the container may travel using many different modes of transit. For example, containers may travel by ship, rail, road, or any combination thereof.

The containers are made of a durable material, such as metal, in order to provide a reusable container that can withstand the harsh conditions associated with shipping. Containers are typically available in several standardized sizes. Several popular sizes of containers include 20, 40, and 53 foot versions. Typically, the exact size and form factors of a container are defined by a standards setting organization, such as International Organization for Standardization (ISO), Transit International Routier (TIR), Association of American Railroads (AAR) Standards, etc. Because the containers come in standard sizes, the complexity in handling the containers is greatly reduced. For example, a crane or forklift used to maneuver a container no longer needs to be adjusted to engage different size containers. The handling apparatus can be optimized to operate on a limited number of standardized sizes of containers.

Because the sizes of containers may be standardized across multiple modes of transport, there is no longer a need to unload and reload cargo from a container when the mode of transport changes. A standardized container may arrive via ship, be loaded onto a train, and then be delivered to a final destination via a truck. Throughout this process, the cargo within the container need never be removed from the container. Because the containers come in standard sizes, each of the modes of transport can be designed to operate with standard sized containers.

Specialized modular shipping containers exist for many different types of cargo. For example, tank containers exist for transporting liquids. Although the container may be specialized to hold a specific type of cargo, it should be understood that the overall size and form factor of the specialized container remains the same as a non-specialized container. The container handling equipment therefore need not be adjusted when dealing with specialized containers. From the perspective of the container handling equipment, all containers are handled exactly the same way, regardless of the type of cargo within the container.

Another example of a specialized container is a refrigerated shipping container, often times referred to as a reefer container, or simply a reefer. Reefers, as implied by the name, are used in situations where the cargo must be maintained at a specific temperature and/or humidity, the temperature usually being colder than the ambient temperature. In some cases, the required temperature may be higher than the ambient temperature. In either case, the term reefer, as used in the disclosure, will refer to a temperature and/or humidity controlled container, regardless of the container being heated or cooled.

Reefers, just as with all modularized containers, are designed to fit the size and form factors as defined by the standards organizations. Thus, reefers can be manipulated with the same handling equipment used to move normal containers. However, reefers present additional challenges that are not present with standard containers. For example, cargo being shipped in a reefer generally needs to be maintained within a specific range of temperature and/or humidity. If the temperature and/or humidity is out of range, even for a short period of time, the cargo may become unusable. For example, food products that are being shipped within a reefer may spoil if the temperature exceeds a defined threshold.

Therefore, there is a need to ensure that a reefer container maintains a temperature and/or humidity within a specified range for the duration of the reefer container's journey. Any anomalous variations in the temperature and/or humidity range within a container should be addressed as quickly as possible to prevent damage to the reefer container's cargo. Embodiments of the invention address these and other problems, individually and collectively.

BRIEF SUMMARY

Remote monitoring and control of the interior environment of a refrigerated shipping container is described. A communications and monitoring device is coupled to a data communications port of a controller of a refrigerated shipping container. The device is able to receive environmental data directly from the controller, without having to install additional instrumentation within the interior of the refrigerated shipping container, and send the environmental data to a remote station. The device is also able to receive data to control the operation of the refrigerated shipping container from a remote station and send this control data to the controller of the refrigerated shipping container through the data communications port.

In one embodiment, an apparatus for communicating with a refrigerated shipping container is disclosed. The apparatus may comprise: a power interface coupled to a power source to provide electrical power to the apparatus; a data interface coupled to a data communications port on the refrigerated shipping container configured to communicate with a controller of the refrigerated shipping container; a communications interface coupled to a transmitter; and a control circuit configured to receive power from the power interface, receive data associated with the refrigerated shipping container from the data interface, and transmit the data associated with the refrigerated shipping container using the communications interface.

In one aspect the data associated with the refrigerated shipping container includes an internal temperature of the refrigerated shipping container. In another aspect, the data associated with the refrigerated shipping container includes other operational parameters associated with the refrigerated shipping container. In a further aspect, the power source coupled to the power interface also provides electrical power to the refrigerated shipping container.

In a further aspect, the apparatus may comprise: the communications interface coupled to a receiver; and the control circuit further configured to receive, from the communications interface, control data to alter the operation of the controller of the refrigerated shipping container and transmit the control data to the controller of the refrigerated shipping container through the data interface. In one aspect, the transmitter is a satellite transmitter. In a further aspect, the data associated with the refrigerated shipping container is received from the controller of the refrigerated shipping container and is received through the data interface. In a further aspect, the apparatus is physically isolated from an interior cargo portion of the refrigerated shipping container. In yet another aspect, the internal temperature of the refrigerated shipping container is measured by the controller of the refrigerated shipping container.

In yet another aspect, the control circuit further configured to: identify a communications protocol used by the controller of the refrigerated shipping container; and communicate with the controller of the refrigerated shipping container through the data interface using the identified communications protocol.

In another embodiment, a method for communicating with a refrigerated shipping container is disclosed. The method may comprise: receiving data associated with the refrigerated shipping container from a controller of the refrigerated shipping container; determining, with a processor, if the data associated with the refrigerated container should be transmitted to a receiving station; and transmitting the data associated with the refrigerated shipping container to the receiving station based on the determination.

In one aspect, the step of determining if the data associated with the refrigerated container should be transmitted comprises: determining if it is time for periodic reporting. In another aspect, the step of determining if the data associated with the refrigerated container should be transmitted comprises: determining if the data associated with the refrigerated container is outside a pre-defined range. In one aspect, the data associated with the refrigerated shipping container includes an internal temperature of the refrigerated shipping container. In another aspect, the data associated with the refrigerated shipping container includes an operational parameter of the refrigerated shipping container.

In a further aspect, the method further comprises: receiving control data, the control data used to control the operation of the refrigerated shipping container; and sending the control data to the controller of the refrigerated shipping container, wherein the controller of the refrigerated shipping container alters the operation of the refrigerated shipping container based on the control data. In one aspect, the control data includes a temperature set point for the refrigerated shipping container. A non-transitory computer readable medium containing instructions which cause a processor to perform the steps of the method is also disclosed.

In yet another embodiment, a system for communicating with a refrigerated shipping container is disclosed. The system may comprise: a monitoring and communications controller configured to communicate with a controller of a refrigerated shipping container to receive data associated with the refrigerated shipping container and send the data associated with the refrigerated shipping container to a data server computer; and the data server computer configured to receive the data associated with the refrigerated shipping container from the monitoring and communications controller and send the data associated with the refrigerated shipping container to a user.

In one aspect, the system may further comprise: the data server computer further configured to receive, from the user, control data used to control the operation of the refrigerated shipping container; and the monitoring and communications controller further configured to receive the control data from the data server computer and send the control data to the controller of the refrigerated shipping container, wherein the controller of the refrigerated shipping container alters the operation of the refrigerated shipping container based on the control data.

These and other embodiments of the invention are described in further detail below.

BRIEF DESCRIPTION OF THE DRAWINGS

FIGS. 4(a-d) depict exemplary screen shots of web pages.

FIG. 6 depicts the Homeport when the SMARTemp tab is activated.

FIG. 8 depicts a display of operational parameters associated with a shipping container.

FIG. 11 depicts a screen used to update reefer operational parameters.

DETAILED DESCRIPTION

Figure 1:
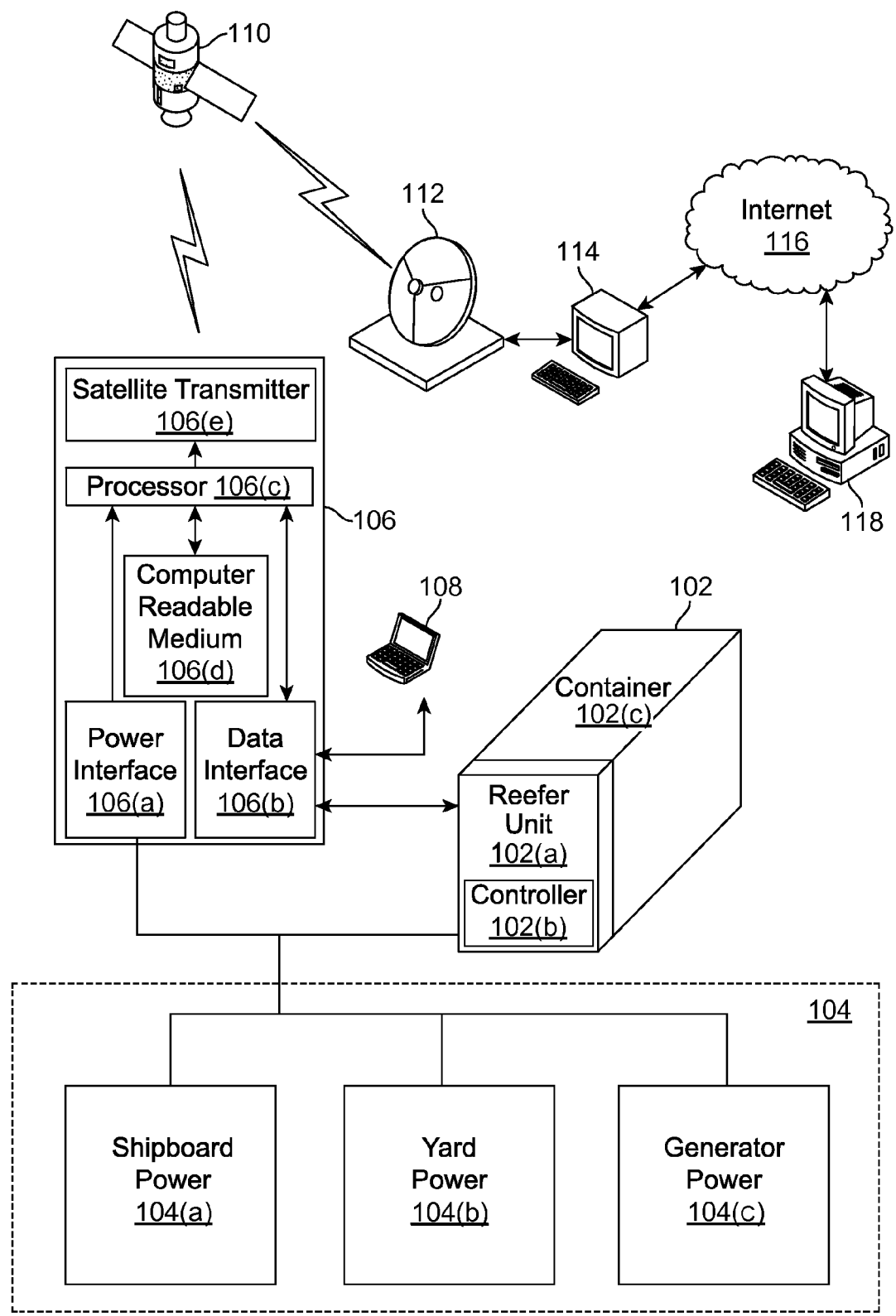
FIG. 1 depicts a high level diagram of a system for use with embodiments of the invention.

Embodiments of the invention provide for real time remote temperature and humidity monitoring of environmentally sensitive cargo being shipped via refrigerated shipping containers. Real time access to temperature and humidity information, regardless of the location of the refrigerated shipping container, provides greater visibility and protection capabilities over the environmentally sensitive cargo. Any variations in the desired temperature and humidity of the cargo can be immediately addressed by shipping personnel prior to the environmentally sensitive cargo sustaining damage. Embodiments of the invention continuously monitor the temperature and humidity of the refrigerated shipping container and can immediately report any out of range conditions via a variety of communications facilities to a remote monitoring station.

In addition to reporting out of range conditions, embodiments of the invention can also periodically report temperature and humidity information to a remote monitoring station. Such periodic reporting allows for a shipper to continuously track the environmental state of the cargo being shipped. The periodic reporting can be adjusted to conform with any applicable regulations regarding monitoring frequency of environmentally sensitive cargo throughout the refrigerated shipping container's voyage. Such periodic monitoring can reduce or eliminate the need to download voyage temperature and humidity data from the refrigerated shipping container for post voyage validation.

Furthermore, real time monitoring is not limited to temperature and humidity information only. Because embodiments of the invention directly interface with the refrigerated shipping container, any operational data related to the refrigerated shipping container can also be monitored and sent to a remote monitoring station on a periodic or out of range basis. Operational data can include information such as faults and alarms generated by the refrigerated shipping container itself.

In some embodiments of the invention, remote control over the refrigerated shipping container is provided as well. A shipper may remotely modify any of the operational characteristics of the refrigerated shipping container without requiring physical access to the container. Operational characteristics such as temperature and humidity can be set while the refrigerated shipping container is mid voyage without requiring intervention of shipping personnel.

All of the above advantages of embodiments of the invention are achieved without requiring any permanent modification to the refrigerated shipping container itself. Because embodiments of the invention directly interface with the refrigerated shipping container, there is no need for the installation of instrumentation, such as temperature and humidity probes. All of the necessary information can be retrieved from the refrigerated shipping container itself. Thus, a shipper may conveniently install and remove embodiments of the invention from the refrigerated shipping container without permanently altering the container, which is advantageous in cases where the shipper may not be the actual owner of the shipping container. Furthermore, there is advantageously no need to install an embodiment of the invention on every refrigerated shipping container used by the shipper, as the invention can be moved from container to container as needed.

These, and other advantages of the invention will be described in further detail below with respect to FIGS. 1-14.

Prior to discussing the specific embodiments of the invention, a further description of the term "operational parameter" is provided for a better understanding of embodiments of the invention. As used herein, an "operational parameter" can refer to any aspect related to the operation of a shipping container. Typically an operational parameter will refer to an environmental aspect of a shipping container, although other embodiments can refer to other aspects. Examples of an operational parameter can include, but is not limited to, temperature, humidity, air pressure, lighting, and air quality (e.g., the mixture or presence of certain gases). Operational parameters can also refer to the status of the components of the shipping container, such as the status of the compressors, cooling fans, coolant flow, coolant temperature, supply voltage, temperature and humidity set points, cargo door status, or any other similar aspect.

An operational parameter can be represented in any number of ways. In some cases, an operational parameter can be represented with a value, often times numeric based. For example, temperature can be represented according to various metrics, such as Fahrenheit, Celsius, Kelvin, or any other temperature scale. In yet other cases, an operational parameter can be represented with a status indication. Such status indications can indentify whether the operational parameter is in a fault state or not. An operational parameter above or below a certain set value is an example of a fault state. A door that is open is another example of a fault state. A derivative of an operational parameter can depend on the operational parameter in any suitable manner. For example, a data interface can read in an operational parameter (e.g., temperature) in Celsius and then transmit the same operational parameter in Fahrenheit.

In some cases, the operational parameter can represent a current value of the operational parameter. For example, the cargo temperature can represent a temperature value measured from within the container. Alternatively, an operational parameter can represent a desired value, such as a temperature value a shipper sets to define the temperature the container should be maintained at.

Exemplary Shipping Operation

In an exemplary reefer shipping operation, a shipper that needs to transport goods requiring temperature and humidity control will notify a shipping agent. If the shipper does not own a reefer, the shipping agent may arrange to have an empty reefer delivered to the shipper. In some cases, the shipping agent may provide an empty reefer that is owned by the shipping agent. In other cases, the reefer may be owned by the shipping line (e.g. ship, rail, truck) that may eventually be involved in transporting the reefer. What should be understood is that the actual ownership of the reefer could be one of many different parties. Embodiments of the present invention advantageously allow for remote monitoring of reefers without requiring any permanent modifications to the reefer itself. Because no permanent modifications are required, it is generally not necessary to obtain permission from the owner of the reefer in order to utilize embodiments of the invention.

The shipper may load the reefer with the goods that are being shipped. The shipper may set the desired temperature and/or humidity of the reefer and then contact the shipping agent. The shipping agent will then arrange for the reefer to be transported to the desired destination. In many cases, the shipper is unaware, and in fact, may not care, what modes of transport are used to deliver the reefer to the desired destination. Any combination of ship, rail, or road is satisfactory.

One problem that can arise in a typical reefer shipping operation is that once the container has left the presence of the shipper, the shipper no longer has the ability to directly monitor or modify the temperature and/or humidity or other parameters within the container. If a malfunction occurs in the reefer, the first indication may be when the container is opened at the destination and it is discovered that the cargo has spoiled, or is otherwise unsatisfactory. Most reefers have the ability to log the temperature and/or humidity at various time intervals, and this historical data can be accessed via a data interface on the reefer. However, this historical data is only useful for showing when the failure occurred, it does nothing to alleviate the fact that the cargo is unusable.

In some cases, personnel are assigned to periodically monitor the reefer while it is in transit to record the temperature and/or humidity being reported by the reefer. If an out of range condition is discovered, the personnel can take corrective action. However, even in such cases, a failure of the reefer will not be discovered until the time for the periodic monitoring occurs. If the period for monitoring is several hours, the cargo may spoil before reefer failure is noticed. Furthermore, under some conditions, it may not be possible for regular manual monitoring of reefers. For example, when traveling aboard a ship, reefers are typically loaded at the top of the stack of containers to provide sufficient cooling for the refrigeration components. Under rough seas, it may not be possible to send personnel to the reefer locations because of safety concerns.

There have been some attempts at remote monitoring of temperature and/or humidity of a reefer, however each of these attempts has significant limitations. For example, monitor units that use Power Line Communications (PLM) on board a ship to read the temperature and/or humidity of the reefer exist. However, this type of monitoring assumes that the reefer owner (who is not necessarily the shipper) has installed the proper equipment. This also requires that the reefer be transported via a conveyance that supports PLM technology. Because the shipper does not necessarily control the particular forms of transport, or the monitoring capabilities thereof, solutions that are dependent on capabilities residing external to the reefer are not optimal.

Other attempts at self contained remote monitoring of temperature and/or humidity require modifications to be made to the reefer. For example, installation of temperature and humidity probes may be required. As explained above, the actual owner of the reefer in many cases is different than the shipper. Modifications to the reefer will require permission of the reefer owner, who may be unwilling to grant such permission.

Embodiments of the invention over come these and other disadvantages of the prior art and will be described in further detail with respect to FIGS. 1-14.

FIG. 1 depicts a high level diagram of a system for use with embodiments of the invention. The system includes a container 102, power source 104, monitoring and communications controller 106, configuration computer 108, satellite 110, ground station 112, data server 114, communications network 116, and user computer 118.

Container 102 may be a refrigerated shipping container, which can be referred to as a reefer container or reefer. A typical reefer contains two main parts. The first is the container portion 102(c), in which the actual goods being shipped are stored. Typically the container portion 102(c) is accessible via a set of doors (not shown) through which cargo can be loaded and unloaded. The container portion 102(c) is generally constructed of a rigid material, such as metal, to withstand the rigors of shipping and stacking. The walls of the container portion 102(c) are generally insulated, such that the temperature within the container portion can be maintained by the reefer unit 102(a), which is described below.

The container portion 102(c) will typically be equipped with several different types of sensors. At minimum, the container portion 102(c) may be equipped with temperature sensors to measure the ambient temperature within the container portion. The container portion 102(c) may also be equipped with temperature sensors to measure the temperature of the air being supplied by the reefer unit 102(a), which may also be called the supply temperature. There can be additional temperature sensors for the air returned to the reefer unit 102(a) after circulating through the container, which may also be called the return temperature.

In addition to temperature sensors for sensing the ambient temperature within the container portion 102(c), there may also be temperature sensors that may be inserted into the cargo that is being shipped. Depending on the goods being shipped, regulations may require that not only the temperature within the container be measured, but also the temperature within the cargo itself. For example, the U.S. Drug Administration (USDA) has regulations for shipping certain goods, such as food and drug products, which requires the internal temperature of the cargo itself to be monitored.

In addition to temperature sensors, there may many other types of sensors within the container portion 102(c). Humidity sensors, light sensors, motion sensors, or other types of sensors may also be included within the container portion 102(c). There may be sensors to indicate if the doors to the container portion 102(c) are open or closed, the physical orientation of the container, or any number of other sensors related to the container portion. Although any number of sensors designed to monitor any number of physical conditions within the container portion 102(c) are described, for purposes of simplicity of explanation, the disclosure will simply refer to temperature. However, a person of skill in the art, given the benefit of this disclosure, would understand that any number of different physical conditions can also be monitored.

The various sensors described above will typically be connected to the reefer unit 102(a). What should be understood is that the various sensors are part of the original design of the refrigerated shipping container 102. The refrigerated shipping container 102 is specifically designed to accommodate these sensors. Any wiring or other connections between the sensors and the reefer unit 102(a) are designed such that the physical integrity of the container portion 102(c) is not compromised. In other words, the sensors described above do not require any modifications of the container portion 102(c) in order to utilize embodiments of the present invention, as these sensors are part of the original equipment of the refrigerated container 102.

Unlike some previous attempts at remote temperature and humidity monitoring, embodiments of the present invention advantageously make use of sensors that are already installed in the refrigerated shipping container 102. Thus, embodiments of the present invention do not suffer from the fact that additional sensors cannot be installed because the shipper (or the party desiring to monitor the container) does not actually own the container. Embodiments of the invention advantageously do not require the mounting of additional sensors or holes to be drilled in the container 102 to accommodate wiring for the additional sensors. Furthermore, embodiments of the invention advantageously read the temperature from the same source as the reefer unit 102(a), thus assuring there is no discrepancy between the readings of the reefer unit and the remotely monitored temperature.

The second portion of container 102 may comprise reefer unit 102(a) which controls the environment of the container portion 102(c). For example, the reefer unit 102(a) can control the temperature and/or humidity in the container portion 102(c). Thus, container 102 can be an environmentally controlled container. The reefer unit 102(a) is typically mounted on or integrated with the container portion such that the overall form factor of the combined unit conforms with standardized shipping containers. Conforming to the form factor of standardized shipping containers allows for reefers to be handled in the same way, using the same handling equipment, as containers that are not environmentally controlled.

Reefer unit 102(a) may include the components to physically condition the air within the container portion 102(c). The reefer unit 102(a) will typically comprise electromechanical components, such as compressors, condensers, fans, or heating elements, that are used to physically condition the container environment. The various electromechanical components necessary to condition the air within a refrigerated container 102 would be known by a person of skill in the art and it is not necessary to describe such components in further detail.

Reefer unit 102(a) may also include a reefer controller 102(b). Reefer controller 102(b) generally comprises control logic to control operation of the electromechanical components of the reefer unit 102(a). The reefer controller 102(b) may be responsible for determining when it is necessary for the conditioning components to be activated. For example, the temperature sensors described above are typically connected to the reefer controller 102(b). In many cases, the reefer controller 102(b) allows for a temperature and/or humidity set point to be entered, and the reefer controller will maintain the container portion at the desired temperature and/or humidity. In some cases, the reefer controller 102(b) will allow for a temperature and/or humidity range to be set, and the reefer controller will activate the conditioning equipment if the temperature and/or humidity is out of range.

The reefer controller 102(b) is generally a sophisticated piece of electronic equipment that contains many of the same capabilities of a general purpose computer. For example, the reefer controller 102(b) may contain a memory in which a history of measured temperatures may be recorded. The reefer controller 102(b) may also monitor the operational parameters of the electromechanical conditioning components. Various operational parameters, such as the status of the compressors, cooling fans, coolant flow, coolant temperature, supply voltage (described below), temperature and humidity set points, cargo door status, and other operational parameters may also be stored. The reefer controller 102(b) may also be able to log to the memory any faults or alarms that occur within the reefer unit 102(a).

Figure 3:
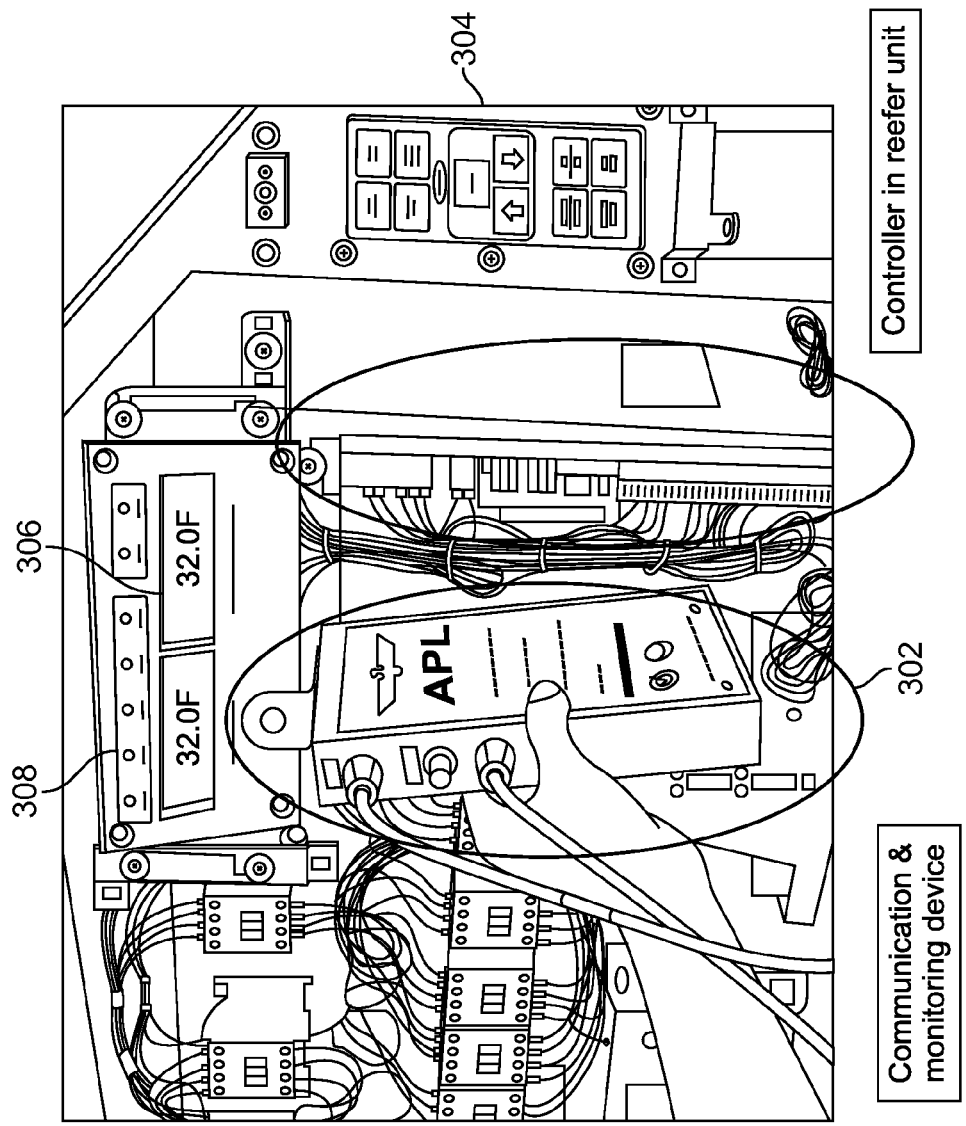
FIG. 3 depicts a controller being installed in a reefer.

The reefer controller 102(b) will typically include an interface panel through which an operator may view and set the various operational parameters of the refrigerated container. For example, the reefer controller 102(b) may include a display which indicates the current temperature within the container portion 102(c). The interface panel may also include controls to allow the operator to set the operating temperature of the refrigerated container and to view the temperature that is currently set. The display panel may also present to the operator any faults or alarms that currently exist within the refrigerated container 102. The operator may also control operation of the refrigerated container through the interface panel, such as initiating a defrost sequence, turning the refrigeration equipment on or off, and resetting or clearing alarms and faults. The operational capabilities of a reefer controller would be known to a person of skill in the art. An exemplary interface panel to a reefer controller is shown in FIG. 3.

Reefer controller 102(b) may include a data communications port, such as an RS232 serial interface, that allows the operational data of the container 102 to be read by a computer or other suitably equipped device. Any suitable data interface, such as Ethernet, Firewire, USB, or the like could also be used in place of a RS232 connection. What should be understood is that the reefer controller 102(b) contains a data interface that allows communication with an external system. Typically, the external system would be a computer, such as a laptop computer (not shown) that can be used to interface with the reefer controller 102(b). Through the data interface, the laptop computer can control all functions of the refrigerated container 102 in the same way as an operator would control the refrigerated container using the interface panel.

The data interface would allow operational data, such as current set temperature, current temperature of the interior of the container, door status, alarm and fault status of the conditioning equipment, and any other data related to the operation of the refrigerated container to be displayed on the laptop. The data interface would also allow operational parameters of the refrigerated container to be updated from the laptop. Control data, such as the temperature set point, resetting of alarms, and other such parameters can be entered into the laptop. The control data can then be sent to the reefer controller 102(b) through the data interface, and the reefer controller will alter the operation of the refrigerated container based on the control data. Put more simply, all the functions available from the interface panel, and more, are made available to an external system through the data interface.

Reefer unit 102(a) may be connected to power source 104. Power source 104 provides power for the operation of the reefer unit 102(a). Power sources can include ship board power 104(a) for power provided by a ship transporting the container 102. Power sources can also include yard power 104(b) which can include any power source provided by a location in which the container is currently located. Power sources can also include generator power 104(c) which includes any power source that is associated with the container 102. In some cases, generator power 104(c) may come from a generator attached to the container.

The reefer typically obtains power for operation from an external source. For example, a reefer traveling aboard a ship may receive power from a shipboard source. A reefer sitting in a yard may receive power from a yard source. In some cases, the reefer may receive power from a generator, also referred to as a gen-set. The gen-set may be located near the reefer, or in some cases mounted on the reefer itself. The gen-set typically contains an internal combustion engine coupled to a generator for generating electrical power. The specific source of power for the reefer is relatively unimportant, except to note that the reefer unit 102(a) requires power for operation.

The system may also include monitoring and communications controller 106, which can also be referred to as the controller. Controller 106 may include power interface 106(a) which is coupled to and receives power from power source 104. In some embodiments, a Y-Connector is used to route power for both the reefer unit 102(a) and the controller 106. What should be understood is that as long as reefer unit 102(a) is receiving power from any source, controller 106 will also receive power. In some embodiments, controller 106 may also have an auxiliary power source, such as a battery (not shown), to provide power when the reefer unit 102(a) is not receiving power.

Power interface 106(a) may contain appropriate components, such as transformers, regulators, and rectifiers, to condition the power provided by power source 104 to the form needed by controller 106. For example, reefers are typically powered by 24 volts AC, whereas controller 106 may require 5 or 12 volts DC. Power interface 106(a) may handle any necessary conversions. In one embodiment, power interface 106(a) may take from 18-36 volts AC and covert this to 5 volts DC as required by monitoring and communications controller 106. It should be understood that the power interface 106(a) can be customized depending on the source of the power and the requirements of the monitoring and communications controller 106.

Controller 106 may also contain data interface 106(b). Data interface 106(b) may be operatively coupled to the reefer controller 102(b) in order to read the temperature and humidity, or other operational data, of the container 102. Data interface 102(b) may also be used to send control data to the reefer controller 102(b). As explained above, the reefer controller 102(b) may contain a data communications port to allow access to an external system. It is through the data interface 106(b) that the monitoring and communications controller 106, an external system, interfaces with the reefer controller 102(b).

Although data interface 106(b) and the data interface on the reefer controller 102(b) may use a standard protocol, such as RS232, firewire, USB, or the like, at the lower communication layers, the protocol used at the application layer is typically proprietary to the manufacturer of the refrigerated container. In other words, although different reefer manufacturers may use the same type of interface (e.g. RS232) the actual format of the information provided from the reefer controller 102(b) may vary between the manufacturers. The particular format for control data, which alters the operation of the reefer controller 102(b), may also be different between different reefer manufacturers.

Many reefer manufacturers will provide the specific protocol used by their reefers if it is requested. Although, even in a case where the manufacturer is not willing to provide the protocol, it can be obtained through other means, such as analyzing the communications from the reefer data interface and reverse engineering the protocol. However, for purposes of this disclosure, it is assumed that the specific protocol used for communication with reefers from different manufacturers is known.

Data interface 106(b) may also provide an interface for connection to configuration computer 108. Configuration computer 108 may be used to program the various functions of controller 106. For example, controller 106 may need to be configured to properly communicate with reefer controller 102(b). As described above, each reefer manufacturer may use a proprietary protocol to communicate using the reefer data interface. Through configuration computer 108, the controller 106 can be provided with the type of reefer that it is being connected to, such that the controller is able to use the correct protocol when communicating with the reefer.

However, it should be understood that the configuration computer 108 is not the only way that the correct protocol can be determined. In some embodiments, the controller 106 may attempt communications with the reefer 102 by cycling through the protocols used by the different reefer manufacturers. If the controller 106 does not receive the response expected according to the protocol currently being tested, the controller can determine it is using the wrong protocol. The controller 106 can then try to communicate using a different protocol and repeat the process. The controller 106 will eventually try the correct protocol and can establish communications or will be able to determine that communications cannot be established.

Configuration computer 108 may be used to configure satellite transmitter 106(e) for proper communication. Although FIG. 1 depicts a satellite 110 communications link, it should be understood that any number of other communications facilities are usable with embodiments of the invention. Alternative communications methods will be described below. Regardless of the particular type of communications, the configuration computer 108 may be used to configure the controller 106 for proper communications. For example, in the case of satellite communications, the controller may need to be configured with proper frequency and channel assignments in order to communicate with the satellite 110.

Controller 106 may be configured to report temperature and/or humidity and operational parameters periodically, or when certain thresholds are exceeded. Configuration computer 108 may be used to set the periodic reporting interval or the threshold values. It should be understood that configuration computer 108 is only needed to initially configure the controller. Once the initial configuration is complete, configuration computer 108 may be disconnected and the controller may operate autonomously.

Controller 106 may also include a processor 106(c) which is coupled to non-transitory, tangible, computer readable medium 106(d). Medium 106(d) may store a set of instructions that are executed by the processor to perform the functions of the controller 106. It should be understood that processor 106(c) and medium 106(d) are intended to describe general control circuit functionality, and are not limited to embodiments with separate processing and storage components. Processor 106(c) is intended to describe any form of control circuit that may be used to implement embodiments of the invention.

In one embodiment, the processor 106(c) is a MSP 430 micro controller from Texas Instruments™. In a different embodiment, the processor may be a 80188 processor from Intel™. Alternative processors may come from AMD™. What should be understood is that the specific control circuit used by the controller 106 is generally not important as long as the control circuit is able to implement the capabilities that are described within the instant disclosure.

Processor 106(c) may be programmed to periodically read the temperature and/or humidity information and other operational parameters from reefer controller 102(b) through data interface 106(b). In some embodiments, processor 106(c) is programmed to autonomous updates from the reefer controller 102(b). The processor may be programmed to periodically report the operational parameters of the reefer to a remote server 114 (described below). The processor may also be programmed to report an operational parameter immediately upon the occurrence of an out of range condition of any of the operational parameters.

Processor 106(c) may also be coupled via a communications interface to satellite transmitter 106(e). Processor 106(c) may send the temperature and/or humidity readings and operational data to satellite transmitter 106(e). In some embodiments, satellite transmitter 106(e) is integrated within controller 106, while in other embodiments, satellite transmitter 106(e) may be a standalone device that interfaces with controller 106. For example, in one embodiment, satellite transmitter 106(e) is an Iridium™ 9601 SBD transceiver. The 9601 transceiver is a small, low-cost, Iridium™-manufactured OEM module for integration by Iridium™ registered partners into a wide variety of applications using the Iridium Short Burst Data Service. It can be used for monitoring, alarms, and tracking.

Although the above description specifies a transmitter only, it should be understood that this is for purposes of clarity of explanation. The transceiver, as the name implies, also contains a receiver for receiving data from a remote location. Operation of controller 106 when using the receiver is described further below. However, it should be understood that embodiments of the invention may operate in a transmit only mode.

Satellite transmitter 106(e) may receive the temperature and/or humidity readings and other operational parameters and transmit the information to satellite 110 orbiting the Earth. Satellite 110 may then relay the readings to ground station 112. Ground station 112 may be coupled to data server 114. Communication between a satellite transmitter 106(e) and a ground station 112 is conventional and is thus not described in great detail.

Although the above description is in terms of a satellite communications system, a person of skill in the art, given the benefit of this disclosure, would understand that embodiments of the invention are not limited to satellite communications. Other possibilities, such as WiFi, WiMax, 3G cellular, 4G cellular, LTE, and other forms of wireless communication have also been contemplated. The particular form of communication used may be dependent on the mode of transport being used. For example, a reefer 102 on board a ship in the middle of the ocean will typically need to use satellite communications, as no other form of communications may be available. Whereas a reefer 102 being transported by rail may have access to any or all of the above exemplary communications systems.

In some embodiments, the controller 106 may be equipped to communicate using more than a single form of communication. For example, the controller may be equipped with both a satellite transmitter and a 3G cellular transmitter. The controller 106 can be programmed to use the most cost effective communications available. As satellite communications are typically more expensive than cellular communications, the controller 106 can be configure to use the 3G cellular transmitter when available (e.g. while the container is on land) and use the satellite transmitter 106(e) only when the 3G cellular communications are unavailable (e.g. while the container is at sea). Other combinations of communications facilities would be readily apparent to one of skill in the art given the benefit of the present disclosure.

Data server 114 may receive the operational parameters and store the operational parameters in a database (not shown). In addition, data server 114 may provide one or more web pages where the temperature and/or humidity readings may be viewed. The web pages may be accessible through the internet 116 by a user computer 118. The web pages may be displayed using a browser application running on the user computer 118. In some embodiments, the data may be sent to user computer 118 in other suitable formats, such as an XML document or a spreadsheet file. Any suitable from of transmitting the data to user computer 118 has been contemplated.

In operation, container 102 will be laden with cargo that requires temperature and/or humidity control. Controller 106 will periodically read the temperature and/or humidity and other operational parameters through the reefer controller 102(b). In some embodiments, the readings are taken continuously, while in other embodiments the readings are taken every several seconds, several minutes, every several hours, or any combination thereof. Controller 106 may then compare the readings to parameters that were configured by configuration computer 108 to determine if the readings should be sent to satellite transmitter 106(e). In some embodiments, the readings are sent periodically, such as at least every second, every minute, every hour, every 2 hours, every 4 hours, or once a day. The time interval for periodic reporting is completely configurable by the user. In some embodiments, controller 106 may include a real-time clock (not shown) such that the controller may be configured to report at certain absolute times of day. For example, at the beginning, middle, or end of every hour, or at certain specified times of day. In addition, controller 106 may report the readings upon certain out of range conditions. For example, if a certain temperature set point is desired, temperature readings outside a configured range may be immediately reported. For example, temperature readings at least 1 degree, 2 degrees, 5 degrees, or 10 degrees outside the configured range may be reported immediately.

If controller 106 determines that temperature and/or humidity readings or other operational parameters should be reported, the data is sent to satellite transmitter 106(e). Satellite transmitter 106(e) transmits the data to satellite 110 which then relays the data to ground station 112. Ground station 112 then sends the data to data server 114. Data server 114 can present the data to user computer 118 through a web page. The web pages will be described in further detail with respect to FIGS. 4(a-d) and FIGS. 5-8.

Embodiments of the present invention provide for several advantages. First, because controller 106 may be powered by the same source as reefer unit 102(a), as long as the reefer unit 102(a) has power, controller 106 will be operational. In practice, this means that the shipper is no longer dependent on facilities provided by the ship, yard, or other transport means for supporting remote temperature and/or humidity monitoring. In other words, if the reefer 102 is operational, regardless of where it is, the controller 106 will also be operational. In addition, because the controller 106 is self contained, and requires no permanent modifications to the reefer 102, the shipper is not dependent on the owner of the reefer installing any additional equipment. The shipper can install the controller independently of the reefer owner.

Furthermore, because the controller may be able to communicate with reefers from different manufacturers, the shipper does not need to maintain different controllers for different types of reefers. The same controller may be removed from one reefer and installed on a different reefer, thus minimizing the expense associated with providing a different controller for each reefer manufacturer. Additionally, embodiments of the invention advantageously allow the shipper to determine the time interval for reporting. Thus, the shipper is no longer dependent on a manual reading of the reefer, over which the shipper has no control.

Figure 2:
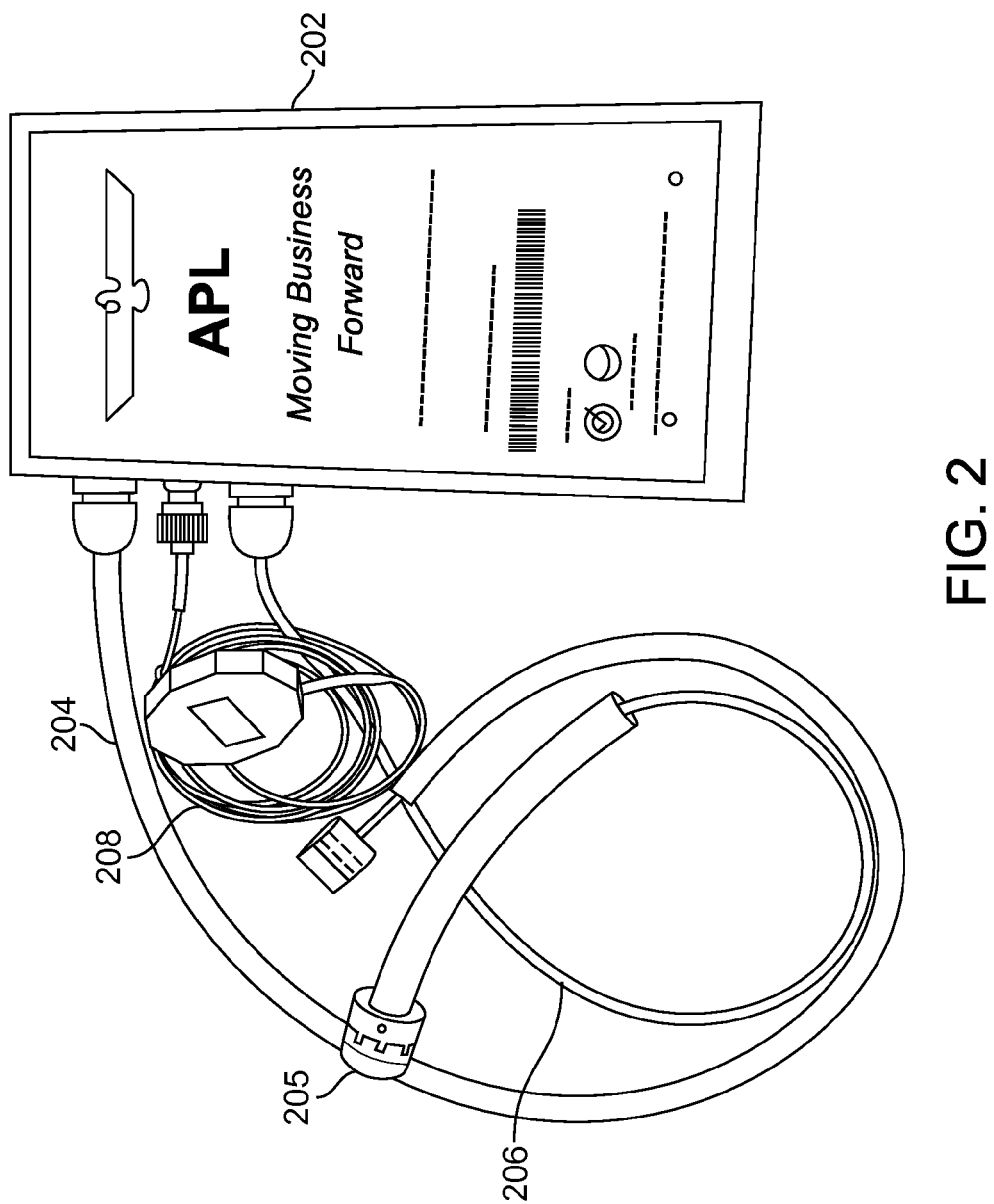
FIG. 2 depicts an exemplary monitoring and communications device.

FIG. 2 depicts an exemplary monitoring and communications device. All of the components of controller 106 as described with respect to FIG. 1 may be contained within housing 202. The housing may be made of a durable material that is capable of withstanding the potentially harsh environmental conditions that may be experienced by a reefer in transit. For example, the housing may be made of an impact resistant material. During reefer handling operations, such as loading or unloading from a ship, truck, or train, the housing 202 may protect the controller from inadvertent damage. The housing 202 may also be watertight, as there is always the possibility that the reefer will be exposed to inclement weather during transit.

Emerging from housing 202 are several cables that may be used to interface with the reefer unit or external world. Cable 206 may emerge from the data interface 106(b) of the controller in order to be connected to the data communications port (or any other communication socket or plug) of the reefer controller. Cable 206 may have a connector 205 that is compatible with the connector that forms the data interface of the reefer controller. In some embodiments (not shown) cable 206 may be equipped with multiple connectors of different types in order to be compatible with different manufacturers of reefers.

Also emerging from housing 202 may be power cable 204, such as, for example, a 24 volts, alertnating current (VAC) power cable. As described above, power from the controller can be provided from multiple sources. Power cable 204 is used to supply the controller with electrical power required for operation.

Finally, antennae 208 may emerge from housing 202. The antennae is needed for wireless communication. The particular type of antennae may be dependent on the particular communications facility that is being used. For example, a cellular 3G antennae may be different than a satellite antennae.

The device shown in FIG. 2 is meant to be exemplary. Embodiments of the invention are not limited to the physical configuration described above. For example, in some cases, the power 204 and data interface 206 cables may be integrated into a single cable, while the antennae may be integrated within the housing 202. A person of skill in the art would recognize alternate configurations given the benefit of this disclosure.

FIG. 3 depicts a controller 302 being installed in a reefer. Controller 302 may be of the type that was described with respect to FIG. 2. An exemplary reefer controller is shown in FIG. 3. As described above, a reefer controller includes an interface panel that allows an operator to configure the reefer. Operator input panel 304 may allow the operator to input parameters such as temperature and humidity set points and to control other functions of the reefer. Displays 306 may allow the operator to view the current temperature within the reefer container as well as what the current temperature set point is.

Alarm indicators 308 may display to the operator if there are any fault conditions that currently exist within the reefer. The operation of the reefer controller is conventional and need not be described in great detail. What should be understood is that controller 302 may be installed onto the reefer controller with no permanent modification required. The controller is simply connected to the reefer controller via the cables describe in FIG. 2 and the housing is secured to the reefer. Advantageously, no physical modifications to the reefer are required.

FIGS. 4(a-d) depict exemplary screen shots of web pages. The web pages may be provided by data server 114. FIG. 4(a) depicts an exemplary screen showing all containers that are being monitored in accordance with embodiments of the present invention. FIG. 4(a) depicts some exemplary data that may be displayed, such as the shipper ID 402, which identifies a particular shipper, a container ID 404 which identifies a specific container, a time 406, which indicates the time of the data reading, a temperature 408, which indicates the temperature at the time of the reading, a temperature set 410, which indicates the set point for the temperature, a humidity 412, which indicates the humidity at the time of the reading, and a humidity set 414, which indicates the set point for the humidity. It should be understood that the data displayed is merely exemplary. Any data provided by the controller may also be displayed.

FIG. 4(a) depicts a web page that shows all data that is received by data server 114, across all times. It should be noted that the various containers could be located anywhere in the world, and that all the containers are not necessarily in the same place. Furthermore, all of the containers depicted in FIGS. 4(a-d) may not be part of the same shipment or belong to the same shipper. FIG. 4(b) depicts a web page that is similar to FIG. 4(a) except that only the data for a single shipper, with the ID 416 of 007 is shown. In typical operation, the shipper will be presented with a portal web page in order to restrict the displayed data to only that which is relevant to the particular shipper. An exemplary portal is shown in FIGS. 5-7 and 14. As shown in FIG. 4(b), only the data related to shipper ID 007 is displayed. It can be seen that this shipper has two reefers 418, 420 in transit with IDs 111111 and 222222. Looking at the time intervals 422, these two reefers have been configured to report their readings every 2 hours. Although FIG. 4(b) depicts the data readings of multiple times, in some embodiments, only the latest time is shown.

FIG. 4(c) depicts another exemplary web page. Like in FIG. 4(b), the data is filtered by a individual shipper ID 424, in this case, ID 007. The data is further filtered by a single container ID 426, in this case, ID 111111. FIG. 4(d) depicts the data for a different shipper, with the ID 428 of 415. As can be seen from FIG. 4(d), this shipper has configured controller 106 to report the temperature and/or humidity every 30 minutes 430. In addition, as can be seen at time 01:07:00 432, shipper ID 415 may have configured his controller to report an out of range condition immediately upon occurrence, rather than waiting for the next periodic reporting interval. In this way, the shipper can be informed about an out of range condition as soon as it occurs, rather than waiting for the next periodic reporting interval.

Although several exemplary web pages have been described, it should be understood that this is not intended to be limiting. Any additional ordering of the displayed data has also been contemplated.

Figure 5:
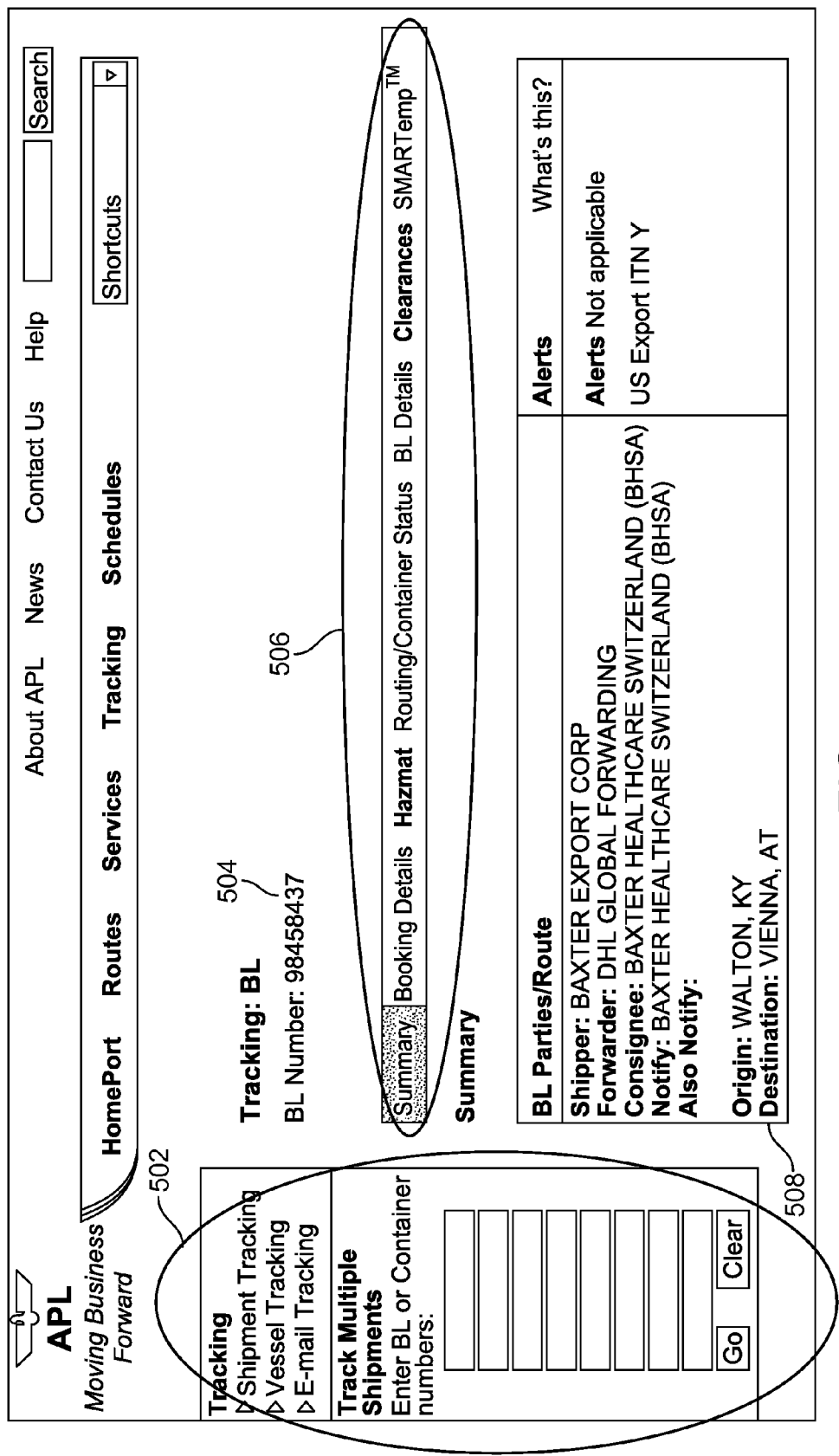
FIG. 5 depicts an exemplary shipper interface.

FIG. 5 depicts an exemplary shipper interface. The web page shown in FIG. 5 may be provided by a shipping line that physically transports the reefer containers. The exemplary web page shown in FIG. 5 is part of the "Homeport" interface offered by American President Lines (APL) which is related to the assignee of the present disclosure. Through the Homeport, an individual shipper can track the containers they are shipping throughout the container's journey. It should be noted that this tracking is available for both refrigerated and non-refrigerated containers. After an individual shipper has logged into the Homeport, the shipper may search for containers that are currently in transit. The shipper is presented with search tools 502 to use in order to locate the particular shipment of interest.

In the screen shot of FIG. 5, the shipper has chosen to search by the BL number 504, which identifies a particular shipment. The shipper may then click on various status tabs 506 to get information about the shipment associated with this particular BL number. As shown, the summary tab has been activated. The summary tab displays the various entities 508 involved with the shipment. The basic features of the APL Homeport are known and it is not necessary to describe those features in great detail as they would be known to a person of skill in the art.

FIG. 6 depicts the Homeport when the SMARTemp tab is activated. SMARTemp™ is a trade name under which embodiments of the invention have been commercialized. When the SMARTemp 602 tab is activated, information related to the remote monitoring of refrigerated containers is displayed. As explained with respect to FIG. 5, the shipper in FIG. 6 has searched on a particular BL number. When the SMARTemp tab is activated, the screen shown in FIG. 6 is displayed. As is shown, this particular shipment comprises two different containers 604, 606. It would be understood by a person of skill in the art that any individual shipment may require more than one container to provide sufficient space to transport the cargo.

Also displayed in FIG. 6 is the last temperature set point 608 reported according by an embodiment of the invention. The display can further include the supply temperature 610, which is the temperature of the cold air as it leaves the reefer unit to circulate in the container. The return temperature 612, which is the temperature of the air after it returns to the reefer unit after circulating, is also displayed. The date and time 614 can also be displayed. Finally, the shipper is given the option 616 to view additional details on a particular reefer.

Figure 7:
FIG. 7 depicts a detailed view of a single container.

FIG. 7 depicts a detailed view of a single container. If a user clicks on the details button 616 a display as shown in FIG. 7 is presented. Through this display, the shipper may obtain more detailed and historical information regarding the temperature and humidity data, as well as a history of the reported data. As shown, the user is given the option to filter 702 the data for a particular time range in order to limit the amount of data that is shown.

The user is presented with much of the same information shown in FIG. 6, however rather than displaying only the latest reported value, all values in the specified time range 702 are displayed. Again, the user can see the container ID 704, the set temperature 706, the supply temperature 708, the return temperature 710, and the humidity 712. In addition, the user may be able to view any additional temperature data, such as the USDA required measurements 714, 716, 718. As explained above, in some shipping scenarios, regulations require that the temperature of the actual cargo itself be monitored. As is shown in FIG. 7, such monitoring was not required for this particular shipment. The various USDA temperatures can include temperatures taken in different parts of the cargo. The user is also able to view the time 720 each of the various measurements was made.

In some embodiments, the exemplary shipper interface may provide a shipper with information in a variety of formats. For example, one embodiment may allow the shipper to view a display of graphical information for tracking the containers they are shipping throughout the container's journey. Such graphical information may provide information in a manner that is easily and quickly understood. Such may be the case when the exemplary shipper interface provides graphical information in a format that shows the values of operational parameters over time.

Figure 14:
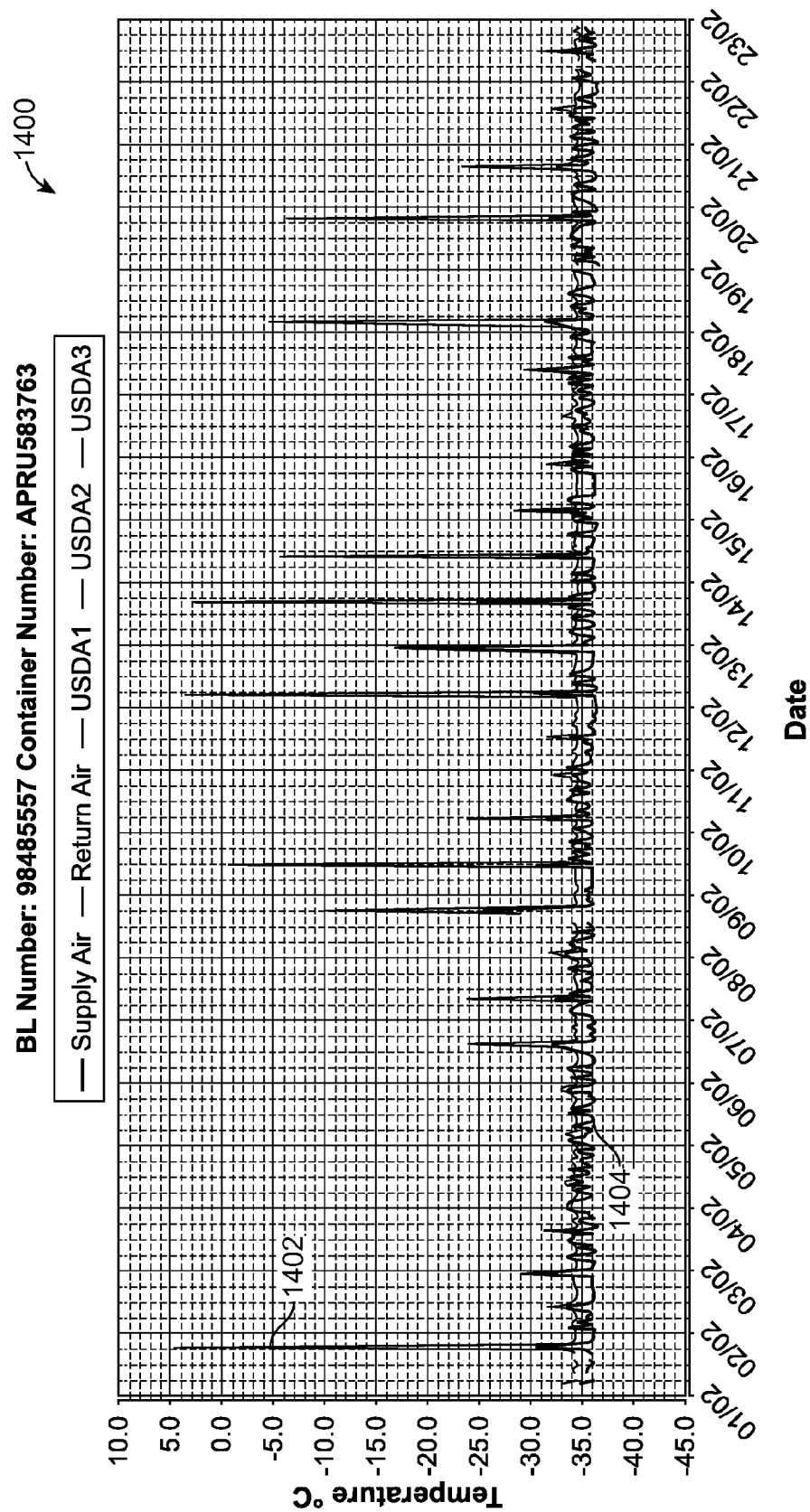
FIG. 14 depicts a graphical view of a single container.

FIG. 14 shows a graphical display 1400 for operational parameters for an individual container. A shipper may view such a graphical display, for example, by logging into the Homeport interface and then searching for containers that are currently in transit and then selecting a specific container of interest. When the container of interest is selected, the Homeport interface may provide a display for information regarding a container in a first format (e.g., information shown in text, see FIG. 7). Alternatively, the shipper may select to view the information regarding the container in a second format (e.g., graphical information). The graphical display 1400 shown in FIG. 14 is an example of graphical information. As shown, graphical display 1400 is a two-dimensional graph showing an operational parameter as a series of connected data points over an interval of time. Graphical display 1400 shows series 1402 and 1404 over the same interval of time. Series 1402 represents the various values for "Return Air" (e.g., the temperature of the air returned to the reefer unit after circulating through the container) over time. Series 1404 represents the various values for "Supply Air" (e.g., the temperature of the air being supplied to the container by the reefer unit) over time. Depending on the embodiment, series 1402 and 1404 can be visually distinguished from each other using, for example, different colors, different line patterns, or any other visual distinction.

The graph shown in FIG. 14 is provided for purposes of illustration and should not be understood as a limitation to other embodiments. For example, a graphical display may provide more or less information according to other embodiments. In one way, a graphical display can show additional or fewer data series. The graphical display may show a humidity time series, cargo temperature series, or any other series based on data described herein. Further, the graphical display may show a data series that is a function of one or more operational parameters. Such a data series can, for example, show the rate of change of an operational parameter (e.g., return air or USDA temperature values) as a function of another operational parameter (e.g., supply air temperature values). Poor rate of change can signal an operational problem with the container, which may be caused by various factors. For example, the location of a container, damage to or leaks in the container, or improper operation may make it difficult to maintain a desired operational environment for the reefer. In one way, a data series measuring the rate of change of an operational parameter in relationship to another operational parameter can then be used to identify problems in the system with respect to a container.

FIG. 8 depicts a display of operational parameters. As described above, the controller 102(b) is not limited to reading temperature and humidity data from the reefer. Through the data port on the reefer, any operational parameter that is available to the reefer controller 102(b) can also be sent to the remote data server 114 for presentation to the user. As described above, operational parameter can include any information that is available to the reefer controller. Some exemplary pieces of such information are shown in FIG. 8, however it should be understood that this data is merely exemplary and is not intended to be limiting.

As shown in FIG. 8, operational parameters that may not be directly related to the temperature and/or humidity within the reefer container may also be presented to the user. Some examples of such data can include the status of the door 802 indicating if the container door is opened or closed. In addition, operational status of the conditioning equipment 804 may also be displayed. For each operational parameter, an indication 806 may be provided to indicate if the particular parameter is operating normally or is in a fault condition, such as out of range or an alarmed state. Such information, for example, may be similar to the status information 308 described in FIG. 3. In addition, the operational parameter can include information such as the current set points 808 for the temperature and humidity of the reefer.

Figure 9:
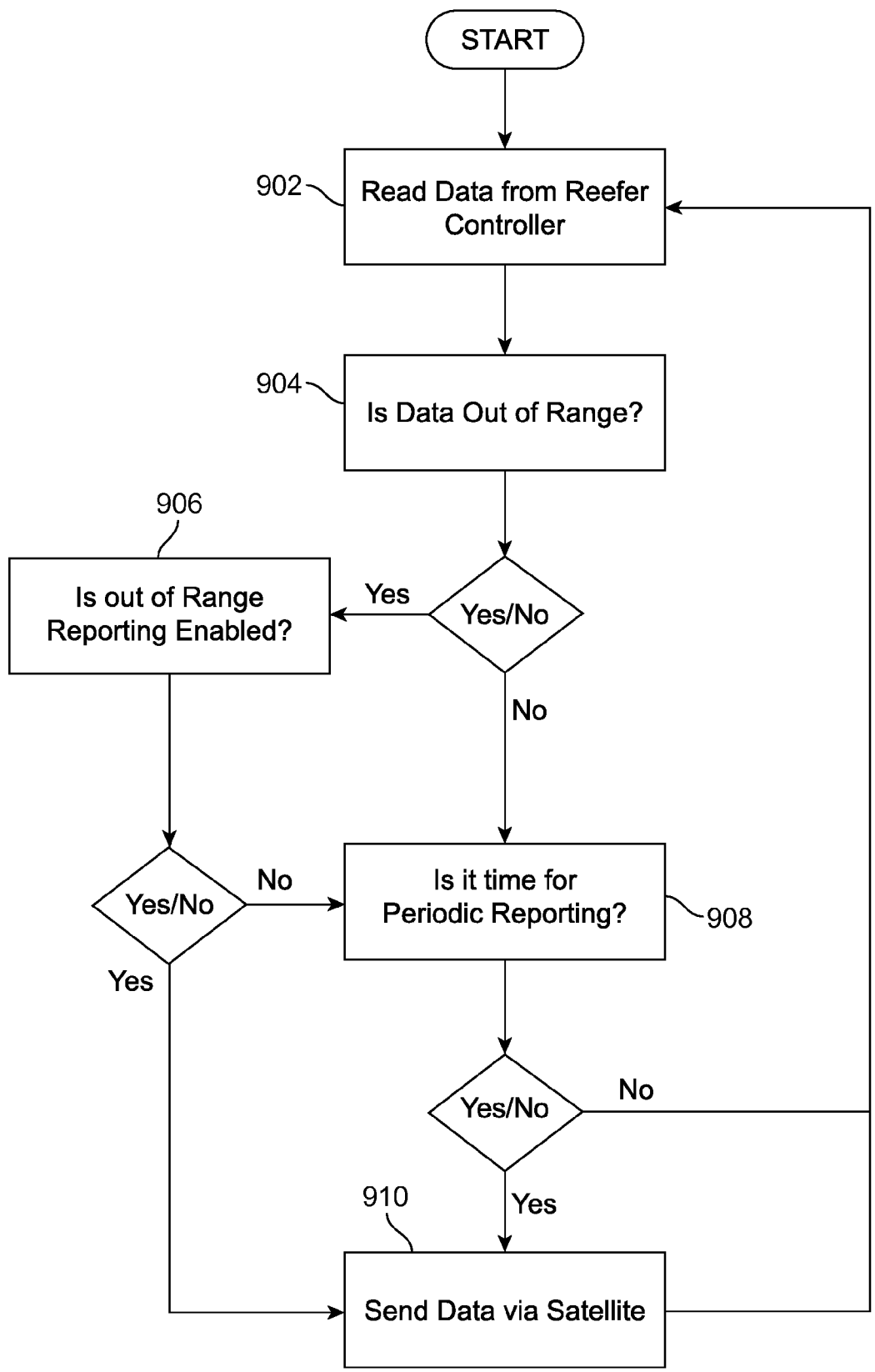
FIG. 9 depicts a flowchart according to an embodiment of the present disclosure.

FIG. 9 depicts a flowchart according to an embodiment of the present disclosure. The process begins at step 902 wherein the data is read from the reefer controller. As described earlier, the frequency of data being read from the reefer controller is configurable by the user. The process then continues to step 904 where it is determined if the data is out of range. As explained above, the range of allowable data values is also configurable by the user. If the data is out of range, the process goes on to step 906, wherein it is determined if out of range reporting has been enabled by the user. In some cases, the user may not require an out of range condition to be reported immediately and is willing to wait until the next periodic interval for reporting. If out of range reporting is not enabled, the process continues to step 908 where it is determined if it is time for periodic reporting.

As mentioned above, the time interval for periodic reporting is configurable by the user. If it is not time for periodic reporting, the process returns to step 902 and begins again. If it is time for periodic reporting, or if the data is out of range and out of range reporting is enabled, the process continues on to step 910, wherein the data is sent via the satellite to the data server. The process then returns to step 902 and repeats.

Figure 10:
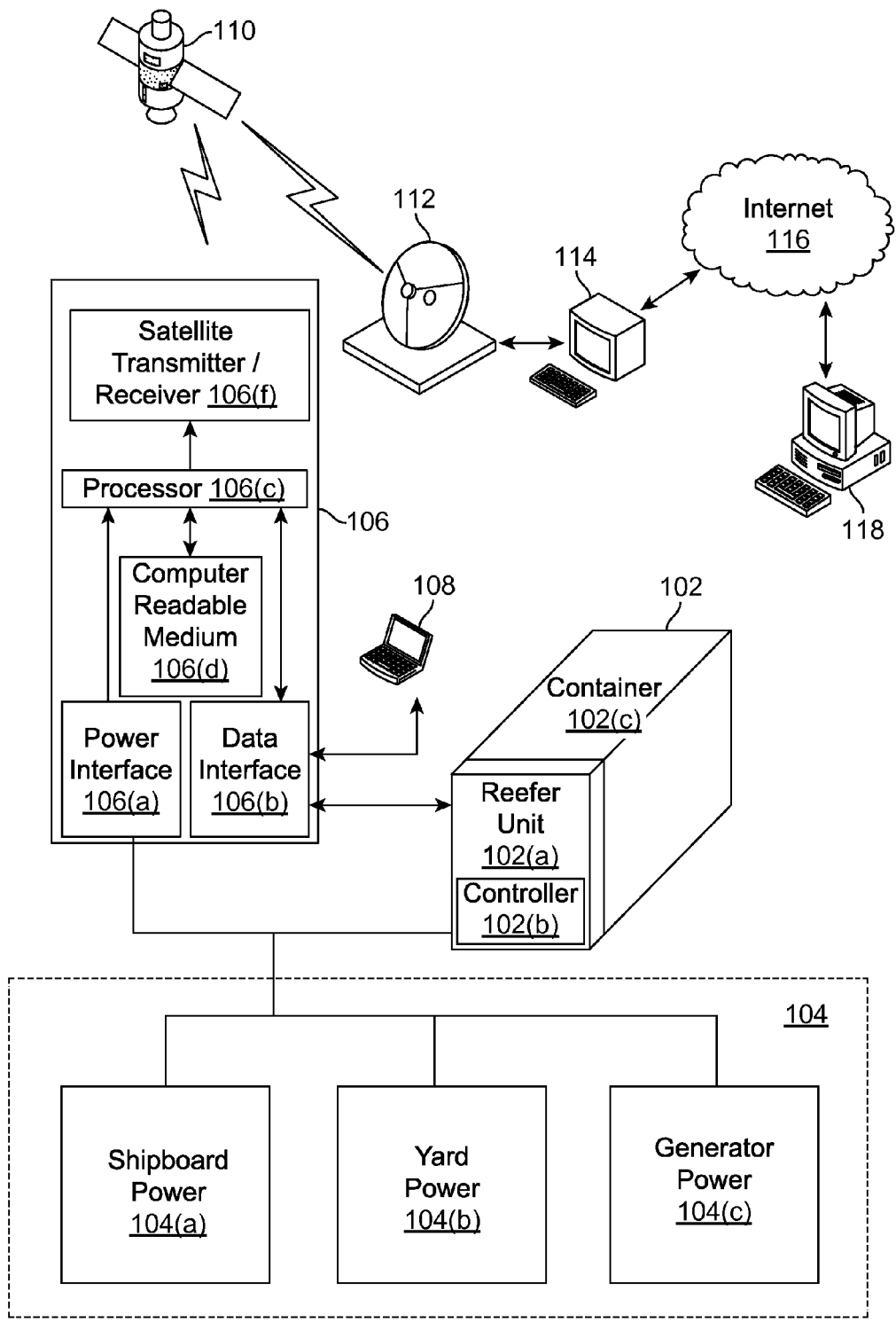
FIG. 10 depicts an alternate embodiment of the invention.

FIG. 10 depicts an alternate embodiment of the invention. The system depicted in FIG. 10 is essentially the same as the one depicted in FIG. 1. The difference being that instead of simply utilizing the transmitter 106(e), FIG. 10 uses both the transmitter and a receiver 106(f). As mentioned above, in one embodiment, the satellite communications system is provided by Iridium™ which allows for two way communications. Some embodiments of the invention utilize the two way communication in order to allow a remote user 118 to control the operation of the reefer 102 without requiring physical access to the operator interface panel of the reefer.

As explained above, the data interface on both the controller 106 and the reefer controller 102(b) are capable of two way communications. A remote user 118 accessing an interface screen, such as the one described below in FIG. 11, may alter operational parameters of the reefer controller 102(b). For example, the remote user 118 may change the temperature set points, resent alarms, or even turn the reefer unit 102(b) off. The remote user enters the desired operational changes and submits the changes to the data server 114. The updates to the operations of the reefer 102 may be called control data. The control data is then sent, via the satellite 110 to satellite receiver 106(f) of the controller 106. The control data is then processed by the processor 106(c) to translate the control data into the format required by the reefer 102.

As explained above, different manufacturers of reefers may use different protocols to control the reefer 102. Once the processor 106(c) has converted the control data to the protocol required by the reefer controller 102(b), the processor, through the data interface 106(b) may send the control data to the reefer controller 102(b). The reefer controller 102(b) may then alter the operation of the reefer to conform to the newly updated control data.

FIG. 11 depicts a screen used to update reefer operational parameters. Just as with the other displays, the screen in FIG. 11 may present identification information 1102 for a particular reefer container. The screen may also display the operational parameter items 1104 of the reefer including the current state 1106. Such status is similar to the status described with respect to FIG. 8. For example, the operational information can include an item identifier, such as "Coolant Temp." and the current status of that item. As shown in FIG. 11, the item "Coolant Temp." is currently in an alarmed state. The user may then be allowed to make various selections to update the operational state of the reefer. For example, in the case of an alarm, the user may be given the option to reset 1108 the alarm.

In addition to alarm information, the user may also be able to update operational parameters such as the current temperature 1110 and humidity 1112 set points. Thus, the shipper is advantageously allowed to alter the temperature and humidity set points while the reefer is in transit, without requiring assistance from personnel associated with the ship, truck, or rail on which the container is being transported.

As should be clear, without an embodiment of the invention, if a shipper desired to alter the temperature of his shipment, he would first need to determine where the reefer is (e.g. ship, truck, train). The shipper would then need to locate personnel associated with that entity, and send those personnel instructions to alter the temperature of the reefer. In many cases, this communications is extremely difficult or impossible. Furthermore, even if the communications with the transporter's personnel is possible, there may be a delay in taking action. For example, a reefer moving by train cannot be physically accessed by shipping personnel while the train is in motion. Thus, even if the instructions are received, the operational parameter of the reefer cannot be changed until the train has come to a stop. Embodiments of the invention solve this problem by advantageously allowing direct and immediate control of the reefer from users remotely located from the reefer.

It should be understood that not all operational parameters provided by the reefer controller can be remotely updated. For example, container door status 1114 may be indicated, but there is no way of remotely controlling the door. However, the information could still be utilized. For example, if the container door is open, the shipper may instruct the reefer to turn off, as there is no reason to provide refrigeration to the container if all the cold air will escape from the open door.

Once the user has made any operation changes desired, the user may click on a update 1116 button. This may cause the generation of control data which will be sent to the reefer controller 102(*b*) through the satellite 110 and the controller 106 as was described above. The reefer controller may then alter its operational parameter based on the control data.

Figure 12:
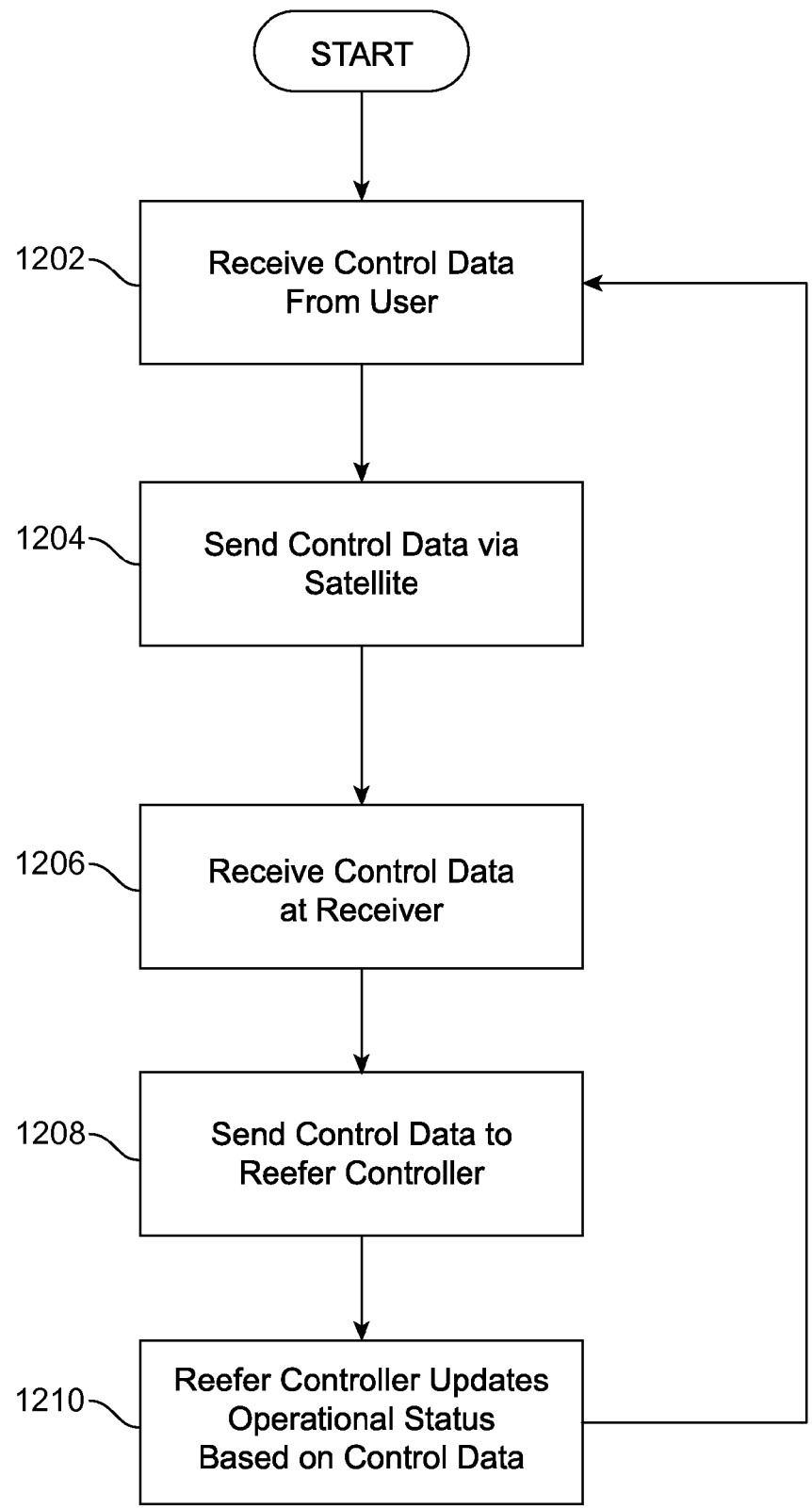
FIG. 12 depicts a flowchart according to an embodiment of the present disclosure.

FIG. 12 depicts a flowchart according to an embodiment of the present disclosure. The process starts at step 1202 in which control data from a user is received. As explained above, control data may be received from a user through an interface as described with respect to FIG. 11. The process may then continue to step 1204 wherein the control data is sent via a satellite. At step 1206 the control data may be received from the satellite by the receiver of the controller. At step 1208, the controller may send the control data to the reefer controller. As described above step 1208 may also include modifying the control data to conform with the protocol expected by the reefer controller. At step 1210 the reefer controller may update is operational parameters based on the control data. This may include resetting alarms, altering temperature or humidity set points, or any number of other operational items on the reefer.

Figure 13:
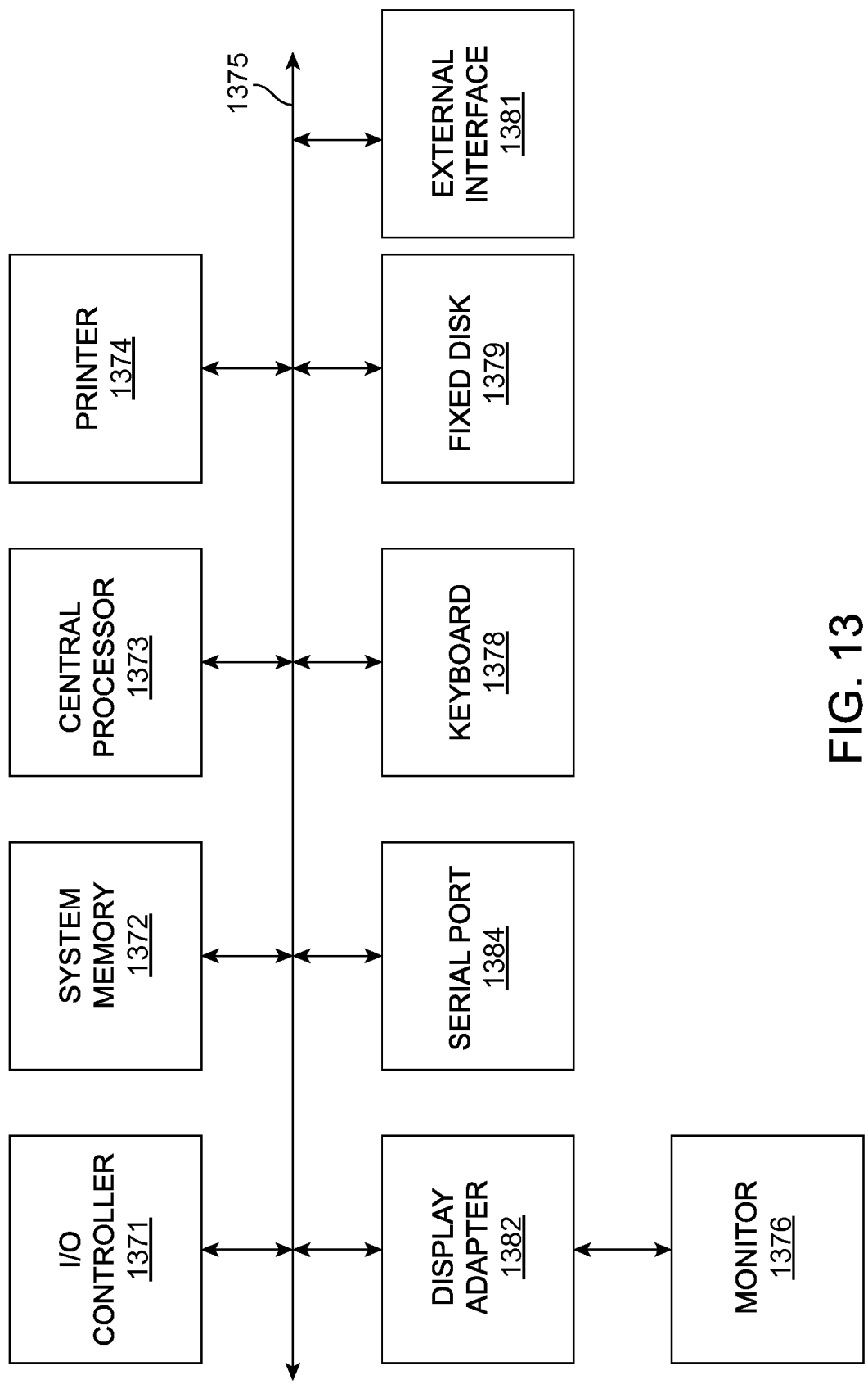
FIG. 13 is a block diagram of a computer apparatus.

FIG. 13 is a block diagram of a computer apparatus. The components in the computer apparatus may be present in any of the elements shown in any of the preceding figures. The subsystems shown in FIG. 13 are interconnected via a system bus 1375. Additional subsystems such as a printer 1374, keyboard 1378, fixed disk 1379 (or other memory comprising computer readable media), monitor 1376, which is coupled to display adapter 1382, and others are shown. Peripherals and input/output (I/O) devices, which couple to I/O controller 1371, can be connected to the computer system by any number of means known in the art, such as serial port 1377. For example, serial port 1377 or external interface 1381 can be used to connect the computer apparatus to a wide area network such as the Internet, a mouse input device, or a scanner. The interconnection via system bus allows the central processor 1373 to communicate with each subsystem and to control the execution of instructions from system memory 1372 or the fixed disk 1379, as well as the exchange of information between subsystems. The system memory 1372 and/or the fixed disk 1379 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques.

The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, may be present on or within different computational apparatuses within a system or network. It may also reside wholly outside of any computer apparatus in some embodiments. A computer readable medium may be embodied by one or more volatile and/or non-volatile memory devices using any suitable optical, electrical, and/or magnetic means of data storage.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

For example, it should be understood that containers can have any number of reefer controllers to monitor various operational parameters of the container. To illustrate, a container can include a first reefer controller to monitor temperature and humidity, as described above, and a second reefer controller to monitor atmosphere of the container. Monitoring the atmosphere can include reading the levels of oxygen, carbon dioxide, carbon monoxide, nitrogen dioxide, or any other similar quality of atmosphere. Such a second reefer controller can be installed on the same or separate reefer unit. For example, a second reefer unit can be installed at an air vent of the container.

The controller 106, in some embodiments, can be operatively coupled to two separate reefer controllers. For example, the controller 106 can be operatively coupled to a first reefer controller (e.g., 102(*b*)) that monitors temperature and humidity using one data interface (e.g., a RS232 serial interface, firewire, USB, or wireless interfaces). In addition, the controller 106 can be operatively coupled to a second reefer controller (not shown) that monitors atmosphere through the same or different types interface (e.g., a wireless interface, such as Bluetooth, Wi-Fi IEEE 802.11, or any other similar wireless communication to support a wireless mesh network). Using a single controller to obtain operational parameters from multiple reefer controllers provides comparatively complete information regarding the environment of the container while limiting the setup and hardware costs.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A removable apparatus for communicating with a shipping container comprising:
    a power interface configured to be coupled to a power source that is external to the removable apparatus and the same source as used by a first controller or a second controller of the shipping container to provide electrical power directly to the removable apparatus for the operation of the removable apparatus;
    the power interface further configured to condition the power provided by the power source to the form needed by the removable apparatus;
    a data interface configured to be coupled with a data communications port on the shipping container,
    the data interface configured to communicate with the first controller and the second controller of the shipping container, regardless of the location of the shipping container, wherein the first controller and the second controller of the shipping container monitor an operational parameter associated with the shipping container and the first controller and the second controller are connected to one or more sensors of the shipping container;
    wherein the operational parameter associated with the shipping container includes set temperature, internal temperature, set humidity, internal humidity, air pressure, lighting, air quality, status of compressor, status of cooling fan, coolant flow, coolant temperature, supply voltage, door status, or faults or alarms that occur within the shipping container,
    a communications interface coupled to a transmitter; and
    a control unit configured to determine a correct protocol for communicating with the first controller and the second controller of the shipping container,
    the control unit is further configured to establish communications with the shipping container based on the determination of the correct protocol,
    the control unit further configured to receive, via the data interface, the operational parameter associated with the shipping container from the first controller or the second controller of the shipping container,
    the control unit further configured to determine whether the operational parameter associated with the shipping container and received from the first controller or the second controller of the shipping container, is outside a predetermined range,
    based on a determination that the operational parameter is outside a predetermined range, the control unit further configured to determine if the operational parameter associated with the shipping container and received from the first controller or the second controller of the shipping container should be transmitted based on whether an out of range reporting has been enabled for the operational parameter,
    based on the determination that the operational parameter associated with the shipping container and received from the first controller or the second controller of the shipping container should be transmitted, the control unit is further configured to transmit the operational parameter, or a derivative thereof, associated with the shipping container, using the communications interface,
    the control unit configured to transmit the operational parameter real time throughout the shipping container's journey regardless of the location of the shipping container.

2. The apparatus of claim 1 wherein the internal temperature of the shipping container is measured by at least the first controller of the shipping container.

3. The apparatus of claim 1 wherein the shipping container is a refrigerated shipping container.

4. The apparatus of claim 1 wherein the power source coupled to the power interface also provides electrical power to the shipping container.

5. The apparatus of claim 1 further comprising:
    the communications interface coupled to a receiver; and
    the control circuit further configured to receive, from the communications interface, control data to alter the operation of the first controller or the second controller of the shipping container and transmit the control data to the first controller or the second controller of the shipping container through the data interface.

6. The apparatus of claim 5 wherein the control unit is further configured to convert the control data to the protocol required by the first controller or the second controller of the shipping container.

7. The apparatus of claim 1 wherein the transmitter is a satellite transmitter.

8. The apparatus of claim 1 wherein the apparatus is physically isolated from an interior cargo portion of the shipping container.

9. The apparatus of claim 1, wherein the apparatus is configured to be installed and removed from the shipping container without permanently altering the container.

10. The apparatus of claim 1, wherein the apparatus is configured to communicate with shipping containers from different manufacturers.

11. The apparatus of claim 1 wherein the control unit is configured to determine a correct protocol for communicating with the shipping container by cycling through protocols until the correct protocol is determined.

12. The apparatus of claim 11 wherein the control unit is further configured to transmit the operational parameter via a cellular transmitter and a satellite transmitter.

13. The apparatus of claim 12 wherein the control unit is further configured to transmit the operational parameter via cellular transmitter when available and transmit the operational parameter via satellite transmitter when cellular communications are unavailable.

14. The apparatus of claim 1 wherein the data interface is further configured to communicate with more than two controllers of the shipping container.

15. The apparatus of claim 1 wherein the first controller of the shipping container monitors temperature and humidity of the shipping container.

16. The apparatus of claim 1 wherein the second controller of the shipping container monitors atmosphere.

17. The apparatus of claim 1 further comprising:
a control circuit configured to receive power from the power interface.

18. The apparatus of claim 1 wherein the control unit is further configured to determine the most effective communications available based on a mode of transport being used.

19. The apparatus of claim 1 wherein the second controller is installed in an air vent of the shipping container.

20. The apparatus of claim 1 wherein the first controller monitors at least one operational parameter using a first data interface and the second controller monitors as least one operational parameter using a second data interface.

21. The apparatus of claim 20 wherein the first data interface and the second data interface are different types of interfaces.

22. The apparatus of claim 21 wherein the different types of interfaces include RS232 serial interface, firewire, USB, or a wireless interface.

23. The apparatus of claim 20 wherein the first data interface is a wired interface and the second data interface is a wireless interface.

24. A method for communicating with a shipping container comprising:
receiving, at a removable communications and monitoring device, power via a power interface configured to be coupled to a power source that is external to the removable communications and monitoring device and the same source as used by a first controller or a second controller of the shipping container to provide electrical power directly to the removable communications and monitoring device for the operation of the removable communications and monitoring device;
determining a correct protocol for communicating with the first controller and the second controller of the shipping container, wherein the removable communications and monitoring device is configured to communicate with the first controller and the second controller of the shipping container, regardless of the location of the shipping container, wherein the first controller and the second controller of the shipping container monitor an operational parameter associated with the shipping container and the first controller and the second controller are connected to one or more sensors of the shipping container;
establishing communications with the shipping container based on the determination of the correct protocol;
receiving, at the removable communications and monitoring device, an operational parameter associated with the shipping container from the first controller or the second controller of the shipping container, wherein the communications and monitoring device is able to receive the operational parameter directly from the first controller or the second controller of the shipping container real time during the shipping container's journey regardless of the location of the shipping container, without having to install additional instrumentation within the interior of the refrigerated shipping container;
determining whether the operational parameter associated with the shipping container and received from the first controller or the second controller of the shipping container, is outside a predetermined range;
based on a determination that the operational parameter is outside a predetermined range, determining, by the communications and monitoring device, if the operational parameter received from the first controller or the second controller of the of the shipping container and associated with the container should be transmitted to a receiving station by determining whether an out of range reporting has been enabled for the operational parameter;
determining, by the communications and monitoring device, the most effective communications available based on a mode of transport being used; and
based on a determination that the operational parameter should be transmitted, transmitting the operational parameter, or a derivative thereof, associated with the shipping container to the receiving station based on the determination that the operational parameter received from the first controller or the second controller of the shipping container and associated with the container should be transmitted to a receiving station wherein the operational parameter is transmitted via the most effective communications available.

25. The method of claim 24 wherein the step of determining if the operational parameter associated with the container should be transmitted comprises:
determining if it is time for periodic reporting.

26. The method of claim 24 wherein the operational parameter associated with the shipping container includes an internal temperature of the shipping container.

27. The method of claim 24 wherein the shipping container is a refrigerated shipping container.

28. The method of claim 24 further comprising:
receiving control data, the control data used to control the operation of the shipping container; and
sending the control data to the first controller or the second controller of the shipping container, wherein the first controller or the second controller of the shipping container alters the operation of the shipping container based on the control data.

29. The method of claim 28 wherein the control data includes a temperature set point for the shipping container.

30. The method of claim 28 further comprising:
converting the control data to the protocol required by the first controller or the second controller of the shipping container.

31. A non-transitory computer readable medium containing thereon a set of instructions which when executed by the computer case the computer to
receive power via a power interface configured to be coupled to a power source that is external to a removable apparatus and the same source as used by a first controller or a second controller of a shipping container to provide electrical power directly to the removable apparatus for the operation of the removable apparatus;
determining a correct protocol for communicating with the first controller and the second controller of the shipping container, wherein the removable apparatus is configured to communicate with the first controller and the second controller of the shipping container, regardless of the location of the shipping container, wherein the first controller and the second controller of the shipping container monitor an operational parameter associated with the shipping container and the first controller and the second controller are connected to one or more sensors of the shipping container,
establish communications with the shipping container based on the determination of the correct protocol,
receive an operational parameter associated with the shipping container from the first controller or the second controller of the shipping container, wherein the removable apparatus is able to receive the operational parameter directly from the first controller or the second controller of the shipping container real time during the shipping container's journey regardless of the location of the shipping container, without having to install additional instrumentation within the interior of the refrigerated shipping container;
determine whether the operational parameter associated with the shipping container and received from the first controller or the second controller of the shipping container, is outside a predetermined range;
based on a determination that the operational parameter is outside a predetermined range, determine if the operational parameter received from the first controller or the second controller of the of the shipping container and associated with the container should be transmitted to a receiving station by determining whether an out of range reporting has been enabled for the operational parameter;
determine the most effective communications available based on a mode of transport being used; and
based on a determination that the operational parameter should be transmitted, transmit the operational parameter, or a derivative thereof, associated with the shipping container to the receiving station based on the determination that the operational parameter received from the first controller or the second controller of the shipping container and associated with the container should be transmitted to a receiving station wherein the operational parameter is transmitted via the most effective communications available.

32. A system for communicating with a shipping container comprising:
a monitoring and communications controller configured to:
communicate with a first controller and a second controller of a shipping container to determine a correct protocol for communicating with the first controller and the second controller of the shipping container, regardless of the location of the shipping container, wherein the first controller and the second controller of the shipping container monitor an operational parameter associated with the shipping container and the first controller and the second controller are connected to one or more sensors of the shipping container,
establish communications with the shipping container based on the determination of the correct protocol,
receive an operational parameter associated with the shipping container from the first controller or the second controller of the shipping container real time during the shipping container's journey regardless of the location of the shipping container,
determine whether the operational parameter associated with the shipping container and received from the first controller or the second controller of the shipping container, is outside a predetermined range;
based on a determination that the operational parameter is outside a predetermined range, determine if the operational parameter received from the first controller or the second controller of the shipping container should be sent by determining whether an out of range reporting has been enabled for the operational parameter, and
based on a determination that the operational parameter should be sent, send the operational parameter, or a derivative thereof, associated with the shipping container to a data server computer based on the determination, during the shipping container's journey regardless of the location of the shipping container; and
the data server computer configured to:
receive the operational parameter associated with the shipping container from the monitoring and communications controller and
send the operational parameter associated with the shipping container to a user.

33. The system of claim 32 further comprising:
the data server computer further configured to receive, from the user, control data used to control the operation of the shipping container; and
the monitoring and communications controller further configured to receive the control data from the data server computer and send the control data to the first controller or the second controller of the shipping container, wherein the first controller or the second controller of the shipping container alters the operation of the shipping container based on the control data.

34. The system of claim 33 further comprising:
the monitoring and communication controller further configured to convert the control data to the protocol required by the first controller or the second controller of the shipping container.

35. The system of claim 32, wherein the monitoring and communications controller is further configured to be installed and removed from the shipping container without permanently altering the container.

36. The system of claim 32, wherein the monitoring and communications controller is further configured to communicate with a controller of a shipping container from different manufacturers.

* * * * *